(12) United States Patent
Nagami

(10) Patent No.: US 9,304,359 B2
(45) Date of Patent: Apr. 5, 2016

(54) LIQUID CRYSTAL DISPLAY DEVICE

(71) Applicants: Japan Display Inc., Tokyo (JP); Panasonic Liquid Crystal Display Co., Ltd., Shikama-ku (JP)

(72) Inventor: Takahiro Nagami, Mobara (JP)

(73) Assignees: JAPAN DISPLAY INC., Tokyo (JP); Panasonic Liquid Crystal Display Co. Ltd., Shikama-Ku (JP)

( * ) Notice: Subject to any disclaimer, the term of this patent is extended or adjusted under 35 U.S.C. 154(b) by 81 days.

(21) Appl. No.: 13/749,161

(22) Filed: Jan. 24, 2013

(65) Prior Publication Data

US 2013/0135569 A1    May 30, 2013

Related U.S. Application Data

(63) Continuation of application No. 12/637,856, filed on Dec. 15, 2009, now Pat. No. 8,368,864.

(30) Foreign Application Priority Data

Dec. 15, 2008 (JP) .................................. 2008-318313

(51) Int. Cl.
*G02F 1/1339* (2006.01)
*G02F 1/1335* (2006.01)

(52) U.S. Cl.
CPC ........ *G02F 1/1339* (2013.01); *G02F 1/133514* (2013.01)

(58) Field of Classification Search
CPC .............. H01L 27/1214; H01L 29/786; G02F 1/133514; G02F 1/1339
USPC ...................... 349/42–43, 155–156, 153, 190
See application file for complete search history.

(56) References Cited

U.S. PATENT DOCUMENTS

| | | | |
|---|---|---|---|
| 6,072,557 A | 6/2000 | Kishimoto | |
| 6,384,882 B1 * | 5/2002 | Nagayama et al. | 349/110 |
| 6,750,938 B2 * | 6/2004 | Koyama | 349/156 |
| 6,888,608 B2 | 5/2005 | Miyazaki et al. | |
| 7,088,418 B1 | 8/2006 | Yamashita et al. | |
| 8,334,963 B2 * | 12/2012 | Yoshida et al. | 349/153 |
| 8,363,199 B2 * | 1/2013 | Sekiya et al. | 349/153 |
| 2001/0009447 A1 | 7/2001 | Ohta et al. | |
| 2004/0012751 A1 | 1/2004 | Iizuka et al. | |
| 2006/0001789 A1 * | 1/2006 | Ahn | 349/42 |

FOREIGN PATENT DOCUMENTS

| | | | | |
|---|---|---|---|---|
| JP | 09049916 A | * | 2/1997 | G02B 5/20 |
| JP | 2001-174827 | | 6/2001 | |

\* cited by examiner

*Primary Examiner* — Hoan C Nguyen
(74) *Attorney, Agent, or Firm* — Typha IP LLC

(57) ABSTRACT

A display device includes a display panel having a display region and a peripheral region, the display panel including a TFT substrate, a counter substrate fixed to the TFT substrate by seal material formed at the peripheral region, and liquid crystal interposed between the TFT substrate and the counter substrate. The TFT substrate includes an inorganic film and an organic film, with first column spacers being formed on the counter substrate. The organic film includes a first part which has an island-like shape formed at the peripheral region and a second part formed at the display region, and the seal material covers at least one of the first column spacers and the first part of the organic film, and is in contact with the inorganic film. The first part of the organic film is separated from the second part of the organic film of the organic film.

14 Claims, 23 Drawing Sheets

A-A

A-A

A-A

B-B

B-B

A-A

A-A

A-A

A-A

A-A

B-B

B-B

A-A

A-A

B-B

B-B

A-A

LIQUID CRYSTAL DISPLAY DEVICE

CROSS-REFERENCE TO RELATED APPLICATION

This application is a continuation of U.S. application Ser. No. 12/637,856, filed Dec. 15, 2009, the contents of which are incorporated herein by reference.

The present application claims priority from Japanese application JP 2008-318313 filed on Dec. 15, 2008, the content of which is hereby incorporated by reference into this application.

BACKGROUND OF THE INVENTION

1. Field of the Invention

The present invention relates to a display device and more particularly to a liquid crystal display device excellent in reliability of a seal portion.

2. Description of the Related Art

The uses of liquid crystal display devices have been expanded into various fields because they can be made thin. In the liquid crystal display device, a color filter substrate having color filters or the like formed at places corresponding to pixel electrodes faces a TFT substrate having the pixel electrodes, thin film transistors (TFTs), or the like formed in a matrix, and liquid crystal is interposed between the TFT substrate and the color filter substrate. The transmittance of light through liquid crystal molecules is controlled in each pixel, so that an image is formed.

In the TFT substrate, data lines extending in the vertical direction and arranged in the lateral direction and scanning lines extending in the lateral direction and arranged in the vertical direction are present. A pixel is formed in a region surrounded by the data lines and the scanning lines. The pixel mainly includes the pixel electrode and the thin film transistor (TFT) as a switching element. A large number of pixels formed in a matrix as described above form a display region.

The TFT substrate and a counter substrate are bonded together via a sealing material formed at the peripheries of the substrates. In the display region in this case, a gap between the TFT substrate and the counter substrate is defined via column spacers formed on the counter substrate to form a liquid crystal layer to a predetermined thickness. In a seal portion, glass fibers are mixed into the sealing material, so that the thickness of the seal portion is defined by the diameter of the glass fiber.

However, when the way of determination for the gap between the TFT substrate and the counter substrate is different between the display region and the seal portion, the reliability of the seal portion is impaired, or display unevenness occurs due to the non-uniformity of the gap. JP-A-2001-174827 describes the configuration which makes the gap uniform between the TFT substrate and the counter substrate by using column spacers also in the seal portion.

SUMMARY OF THE INVENTION

In the technique described in JP-A-2001-174827, although the column spacers are formed also in the seal portion, there is no description or teaching about the reliability of the seal portion. In the configuration of JP-A-2001-174827, an alignment film is formed on the TFT substrate, and an alignment film is also formed on the column spacers in the seal portion formed on the counter substrate. The alignment film is an organic material, so that there arises a problem of the adhesive properties between organic materials, resulting in a problem of the reliability of the seal portion.

Also in the technique described in JP-A-2001-174827, when the column spacers are formed in the counter substrate, a black matrix is present at the base of the column spacer both in the display region and in the seal portion. However, there is no description about the relationship between the column spacer and the configuration on the TFT substrate side. The configuration on the TFT substrate side which the column spacers face are very important in view of the relationship of the gaps in the display region and the seal portion as well as in view of the reliability of the seal portion.

It is an object of the invention to make the gap between the TFT substrate and the counter substrate constant in the display region and the seal portion as well as to improve the reliability of the seal portion.

To attain the foregoing object, the invention employs specific means as will be set forth below.

(1) A liquid crystal display device includes: a TFT substrate having pixels each including a pixel electrode and a TFT formed in a matrix to form a display region; a counter substrate having color filters formed corresponding to the pixels and facing the TFT substrate via a seal portion formed at the peripheries of the substrates; and liquid crystal interposed between the TFT substrate and the counter substrate, wherein the TFT is covered with an inorganic passivation film and an organic passivation film, the gap between the TFT substrate and the counter substrate is defined in the seal portion by column spacers formed on the counter substrate and island-like organic passivation films formed on the TFT substrate, and in the seal portion, a sealing material covers the column spacers and the organic passivation films formed like islands and is in contact with the inorganic passivation film on the TFT substrate side.

(2) The liquid crystal display device according to (1), wherein second column spacers are formed outside the portion where the sealing material is formed on the counter substrate side, and second organic passivation films formed like islands are formed so as to face the second column spacers on the TFT substrate side.

(3) The liquid crystal display device according to (1), wherein second column spacers are formed on the display region side of the portion where the sealing material is formed on the counter substrate side, and second organic passivation films formed like islands are formed so as to face the second column spacers on the TFT substrate side.

(4) A liquid crystal display device includes: a TFT substrate having pixels each including a pixel electrode and a TFT formed in a matrix to form a display region; a counter substrate having color filters formed corresponding to the pixels and facing the TFT substrate via a seal portion formed at the peripheries of the substrates; and liquid crystal interposed between the TFT substrate and the counter substrate, wherein the TFT is covered with an inorganic passivation film and an organic passivation film, the gap between the TFT substrate and the counter substrate is defined in the seal portion by column spacers formed on the counter substrate and island-like organic passivation films formed on the TFT substrate, in the seal portion, a sealing material covers the column spacers and the organic passivation films formed like islands and is in contact with the inorganic passivation film on the TFT substrate side, and in the seal portion, semiconductor films are formed like islands on the TFT substrate side.

(5) A liquid crystal display device includes: a TFT substrate having pixels each including a pixel electrode and a TFT formed in a matrix to form a display region; a counter substrate having color filters formed corresponding to the pixels and facing the TFT substrate via a seal portion formed at the peripheries of the substrates; and liquid crystal interposed between the TFT substrate and the counter substrate, wherein the TFT is covered with an inorganic passivation film and an organic passivation film, the gap between the TFT substrate and the counter substrate is defined in the seal portion by column spacers formed on the counter substrate and island-like organic passivation films formed on the TFT substrate, in the seal portion, a sealing material covers the column spacers and the organic passivation films formed like islands and is in contact with the inorganic passivation film on the TFT substrate side, and in the seal portion, color filters are formed like islands on the counter substrate side.

(6) A liquid crystal display device includes: a TFT substrate having pixels each including a pixel electrode and a TFT formed in a matrix to form a display region; a counter substrate having color filters formed corresponding to the pixels and facing the TFT substrate via a seal portion formed at the peripheries of the substrates; and liquid crystal interposed between the TFT substrate and the counter substrate, wherein the TFT is covered with an inorganic passivation film and an organic passivation film, a counter electrode is formed on the organic passivation film, an inter-layer insulating film is formed on the counter electrode, the pixel electrode is formed on the inter-layer insulating film, the gap between the TFT substrate and the counter substrate is defined in the seal portion by column spacers formed on the counter substrate and island-like organic passivation films formed on the TFT substrate, and in the seal portion, a sealing material covers the column spacers and the organic passivation films formed like islands and is in contact with the inter-layer insulating film on the TFT substrate side.

(7) The liquid crystal display device according to (6), wherein in the seal portion, the column spacers formed on the counter substrate are in contact with the inter-layer insulating film formed on the island-like organic passivation films formed on the TFT substrate.

(8) A liquid crystal display device includes: a TFT substrate having pixels each including a pixel electrode and a TFT formed in a matrix to form a display region; a counter substrate having color filters formed corresponding to the pixels and facing the TFT substrate via a seal portion formed at the peripheries of the substrates; and liquid crystal interposed between the TFT substrate and the counter substrate, wherein the TFT is covered with an inorganic passivation film, in the seal portion, first scanning line lead wires and second scanning line lead wires are formed in different layers on the TFT substrate, the gap between the TFT substrate and the counter substrate is defined in the seal portion by column spacers formed on the counter substrate, and in the seal portion, a sealing material covers the column spacers and is in contact with the inorganic passivation films on the TFT substrate side.

(9) A liquid crystal display device includes: a TFT substrate having pixels each including a pixel electrode and a TFT formed in a matrix to form a display region; a counter substrate having color filters formed corresponding to the pixels and facing the TFT substrate via a seal portion formed at the peripheries of the substrates; and liquid crystal interposed between the TFT substrate and the counter substrate, wherein the TFT is covered with an inorganic passivation film, a counter electrode is formed on the inorganic passivation film, an inter-layer insulating film is formed on the counter electrode, the pixel electrode is formed on the inter-layer insulating film, in the seal portion, first scanning line lead wires and second scanning line lead wires are formed in different layers on the TFT substrate, the gap between the TFT substrate and the counter substrate is defined in the seal portion by column spacers formed on the counter substrate, and in the seal portion, a sealing material covers the column spacers and is in contact with the inter-layer insulating film on the TFT substrate side.

According to the invention, in the seal portion, the gap between the TFT substrate and the counter substrate is defined by the column spacers formed on the counter substrate and the island-like organic passivation films formed on the TFT substrate, similarly to the display region. Accordingly, since the gap between the TFT substrate and the counter substrate is precisely set in the display region and the seal portion, particularly the reliability of the seal portion can be ensured.

Further, since the sealing material is in contact with the inorganic passivation film or inter-layer insulating film formed of SiN on the TFT side, the adhesive force of the sealing material can be ensured, and the reliability of the seal portion can be improved.

DESCRIPTION OF THE PREFERRED EMBODIMENTS

The content of the invention will be disclosed in detail according to embodiments.

Embodiment 1

Figure 1:
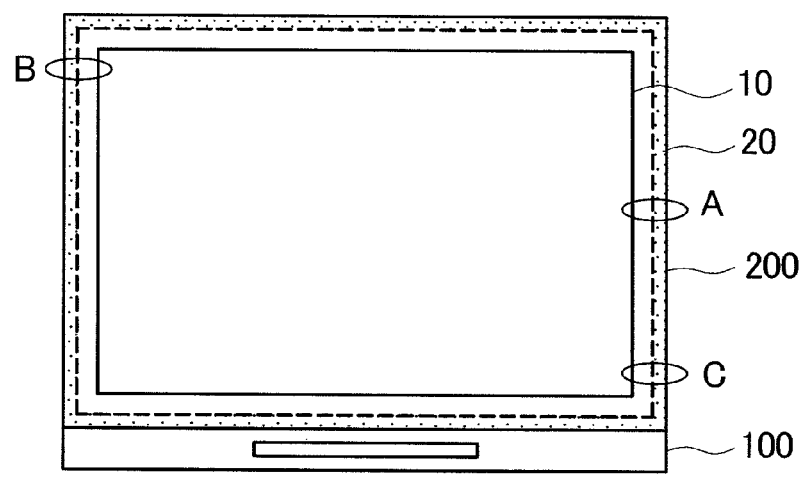
FIG. 1 is a plan view of a liquid crystal display device.

FIG. 1 is a plan view of a liquid crystal display panel according to the invention. FIG. 1 shows a small liquid crystal display panel used for a DSC (Digital Still Camera) or the like. In the liquid crystal display panel, a TFT substrate 100 having pixels formed in a matrix and a counter substrate 200 having color filters formed thereon are bonded together via a sealing material 20 at the peripheries of the substrates. The TFT substrate 100 is formed larger than the counter substrate 200. On a portion of the TFT substrate 100 where the TFT substrate 100 is larger than the counter substrate, an IC driver 30 is arranged and a terminal portion is formed.

In FIG. 1, scanning lines extend in the lateral direction on the TFT substrate 100 and routed around to the terminal portion side via scanning line lead wires on both sides of the TFT substrate. Since a frame portion outside a display region has a small width, the scanning line lead wires are formed as two-layer wiring. The scanning line lead wires routed around to the terminal portion are connected to the IC driver 30.

Figure 2:
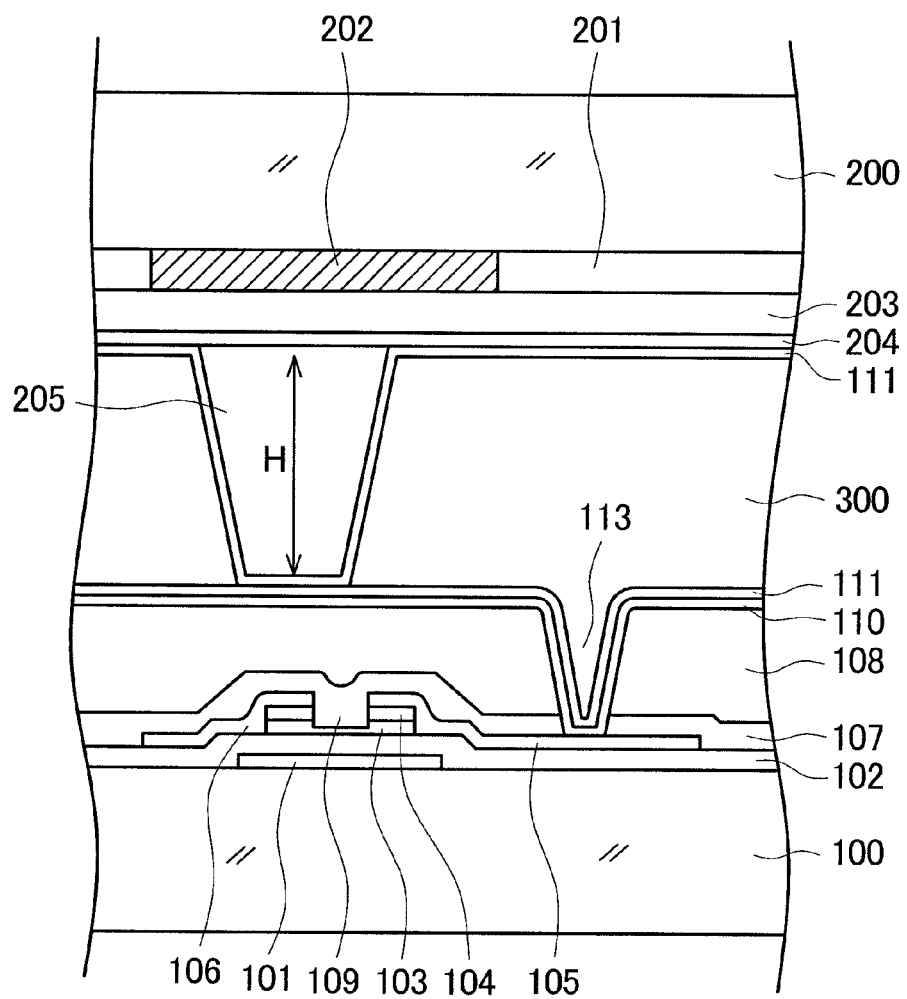
FIG. 2 is a cross-sectional view of a display region of a liquid crystal display device of Embodiment 1.

FIG. 2 is a cross-sectional view of the liquid crystal display panel in the display region. FIG. 2 is a cross-sectional view showing the configuration of a most typical TN type liquid crystal display panel. In FIG. 2, a gate electrode 101 is formed on the TFT substrate 100. The gate electrode 101 is formed by sputtering and thereafter patterned by photolithography. The gate electrode 101 is formed of Al with a thickness of about 300 nm. Not-shown scanning lines or the like are simultaneously formed in the same layer as the gate electrode 101. Common wiring lines which are formed on the TFT substrate 100 for supplying a common voltage to a counter electrode 204 of the counter substrate 200 are also simultaneously formed in the same layer. A gate insulating film 102 is formed so as to cover the gate electrode 101. For example, the gate insulating film 102 is formed by sputtering SiN film. The thickness of the gate insulating film 102 is about 400 nm, for example.

A semiconductor layer 103 is formed above the gate electrode 101 via the gate insulating film 102. The semiconductor layer 103 is formed of a-Si with a thickness of about 150 nm. A channel region of TFT is formed in the a-Si layer. Before disposing a source electrode 105 and a drain electrode 106 in the a-Si layer, an n+Si layer 104 is formed for forming an ohmic contact between the a-Si layer and the source electrode 105 or the drain electrode 106.

The source electrode 105 or the drain electrode 106 is formed on the n+Si layer 104. In the same layer as the source electrode 105 or the drain electrode 106, a ground wire or the like which is connected with video signal lines, protective diodes, or the like is formed. The source electrode 105 or the drain electrode 106 is formed of Mo, Al, or the like. When Al is used, Al is covered with Mo or the like at the upper and lower surfaces thereof. This is because contact resistance sometimes becomes unstable when Al is in contact with ITO or the like in a contact hole 113 portion.

After forming the source electrode 105 or the drain electrode 106, channel etching is performed using the source electrode 105 and the drain electrode 106 as masks. For completely removing the n+Si layer 104 from the channel layer, etching is performed up to the upper portion of the a-Si layer, so that a channel etching region 109 is formed. Thereafter, an inorganic passivation film 107 is formed so as to cover the entire TFT. The inorganic passivation film 107 is formed of SiN. The thickness of the inorganic passivation film 107 is about 400 nm, for example.

An organic passivation film 108 is formed so as to cover the inorganic passivation film 107. The organic passivation film 108 is formed thick because it functions as a planarization film. For example, the organic passivation film 108 is formed to a thickness of about 2 μm. For example, an acrylic resin is used for the organic passivation film 108. A photosensitive acrylic resin is used for the organic passivation film 108, so that patterning can be performed without using a resist.

Thereafter, the contact hole 113 is formed through the organic passivation film 108 and the inorganic passivation film 107 for establishing electrical continuity between a pixel electrode 110 formed of ITO and the source electrode 105 of the TFT. An ITO film serving as the pixel electrode 110 is formed on the organic passivation film 108.

In FIG. 2, an alignment film 111 for aligning liquid crystal molecules is formed on the pixel electrode 110. A liquid crystal layer 300 is interposed between the TFT substrate 100 and the counter substrate 200. Initial alignment of liquid crystal molecules of the liquid crystal layer 300 is defined by the alignment film 111 formed on the TFT substrate 100 and the alignment film 111 formed on the counter substrate 200.

In FIG. 2, color filters 201 are formed on an inner surface of the counter substrate 200. The color filters 201 of red, green, and blue are formed for each pixel, so that a color image is formed. A black matrix 202 is formed between the color filters 201 to improve the contrast of image. The black matrix 202 also functions as a light shielding film for the TFT to prevent photocurrent from flowing into the TFT.

An overcoat film 203 is formed so as to cover the color filters 201 and the black matrix 202. Since the surfaces of the color filter 201 and the black matrix 202 have irregularities, the surfaces are flattened with the overcoat film 203. The counter electrode 204 is formed of an ITO film as a transparent conductive film on the overcoat film 203. Voltage is applied between the pixel electrode 110 formed in the pixel of the TFT substrate 100 and the counter electrode 204 formed on the counter substrate 200 to rotate the liquid crystal molecules, so that transmitted light or reflected light is controlled to form an image.

A column spacer 205 for defining the gap between the counter substrate 200 and the TFT substrate 100 is formed on the counter electrode 204. The column spacer 205 is formed in portions where the black matrix 202 is formed, through which the light of a backlight or the like does not transmit. This is because the alignment of liquid crystal disturbs at the portion where the column spacer 205 is present, causing light leak from the backlight or the like to thereby decrease the contrast.

The height of the column spacer 205 is, for example, 4 which is the same as the thickness of the liquid crystal layer 300. The column spacer 205 is formed of a photosensitive acrylic resin, for example. When an acrylic resin is coated on the entire surface of the counter substrate 200 and exposed to light using a mask, only a portion irradiated with the light becomes insoluble to a developer. Therefore, only the exposed portion is left as the column spacer 205. A resist process is no more required by the use of a photosensitive resin, which decreases the number of processes.

The alignment film 111 is formed so as to cover the column spacer 205 and the counter electrode 204. The initial alignment of the liquid crystal layer 300 is determined by the alignment film 111 formed on the TFT substrate 100 and the alignment film 111 formed on the counter substrate 200. This alignment state is changed by rotating the liquid crystal molecules with the voltage applied between the pixel electrode 110 formed on the TFT substrate 100 and the counter substrate 200, so that light transmitting through the liquid crystal layer 300 is controlled to form an image.

As described above, the gap between the TFT substrate 100 and the counter substrate 200 is defined by the column spacer 205 in a display region 10. In the invention, however, the gap between the TFT substrate 100 and the counter substrate 200 is defined by using the column spacer 205 also in a seal portion. Glass fibers are not mixed into the sealing material 20, and therefore the sealing material 20 includes only an adhesive material.

For making the gap defined by the column spacer 205 precisely the same between the display region 10 and the seal portion, the organic passivation film 108 formed on the TFT substrate 100 is left also in the seal portion at portions on which the column spacer 205 abuts. For ensuring the reliability of adhesion of the sealing material 20, the sealing material 20 is in contact with an inorganic film in the TFT substrate 100. It is preferable that the sealing material 20 be in direct contact with the glass substrate also on the counter substrate 200 side.

Figure 3A:
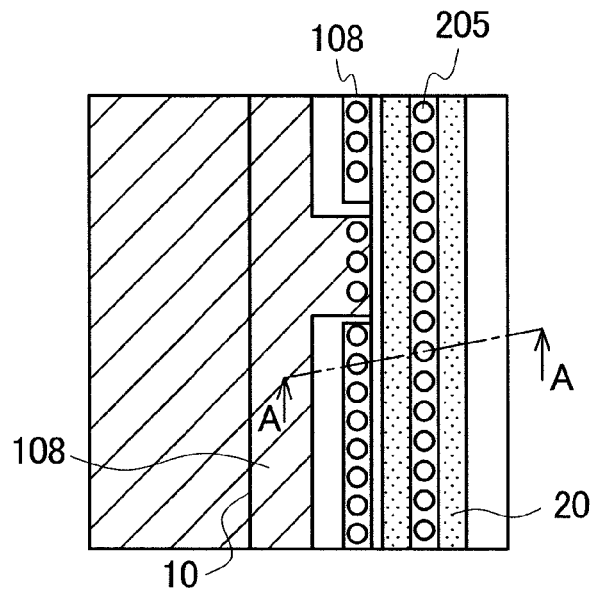
FIG. 3A shows a first shape of a seal portion in Embodiment 1.
Figure 3B:
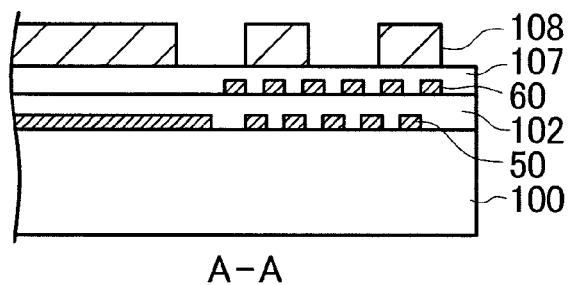
FIG. 3B shows the first shape of the seal portion in Embodiment 1.
Figure 3C:
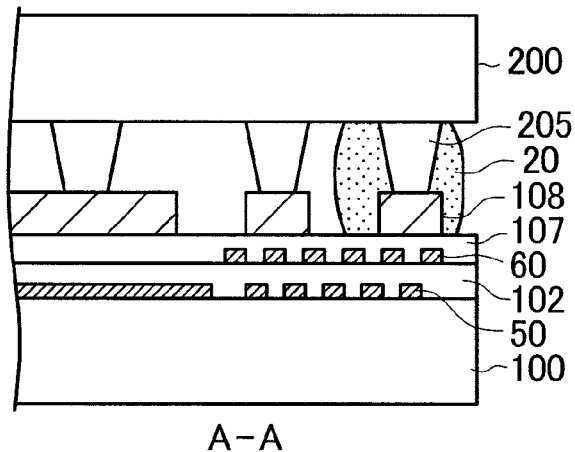
FIG. 3C shows the first shape of the seal portion in Embodiment 1.

FIGS. 3A to 3C, 5A to 5C, and 7A to 7C show the configurations of the invention in the vicinity of the seal portion. FIGS. 3A to 3C show the configuration of the invention in an A portion in FIG. 1. FIG. 3A is a plan view. In FIG. 3A, the organic passivation films 108 are formed like islands also at the periphery of the display region 10. However, the organic passivation film 108 is not formed in the entire seal portion. This is because when the organic passivation film 108 is formed in the entire seal portion, there arises a problem of the adhesive force of the sealing material 20, impairing the reliability of the seal portion.

In FIG. 3A, the column spacers 205 are arranged on the organic passivation films 108 outside the display region 10. This defines the gap between the TFT substrate 100 and the counter substrate 200. Although omitted in FIG. 3A, the column spacers 205 are formed also inside the display region 10. Accordingly, the gap between the TFT substrate 100 and the counter substrate 200 is set such that the gap is precisely the same between inside the display region 10 and outside the display region 10.

FIG. 3B shows the TFT substrate 100 corresponding to a cross section taken along line A-A in FIG. 3A. In FIG. 3B, the gate insulating film 102 and the inorganic passivation film 107 are formed in a stacked manner on the glass substrate. The organic passivation film 108 is formed like an island on the inorganic passivation film 107 at the portions on which the column spacers 205 formed on the counter substrate 200 abuts.

In FIG. 3B, the scanning lines are wired on the TFT substrate 100 and collected to the terminal portion formed on the TFT substrate 100 via the lead wires. For saving the space for arranging the lead wires, the scanning line lead wires have the two-layer structure of first scanning line lead wires 50 and second scanning line lead wires 60.

FIG. 3C is another cross-sectional view taken along the line A-A of FIG. 3A. FIG. 3C shows the state where the counter substrate 200 having the column spacers 205 formed thereon is bonded to the TFT substrate 100 of FIG. 3B via the sealing material 20. Since the column spacers 205 contact the organic passivation films 108 formed on the TFT substrate 100, the gap between the TFT substrate 100 and the counter substrate 200 can be precisely the same between the display region 10 and the seal portion.

In FIG. 3C, the sealing material 20 is in contact with the inorganic passivation film 107 on the TFT substrate 100 side. The inorganic passivation film 107 is formed of an SiN film and has a strong adhesive force to an adhesive material, so that the reliability of the seal portion can be improved.

In FIG. 3C, the column spacer 205 and the island-like organic passivation film 108 corresponding thereto are also formed on the display region 10 side of the portion where the sealing material 20 is formed for precisely defining the gap between the TFT substrate 100 and the counter substrate 200 in the seal portion.

Figure 4A:
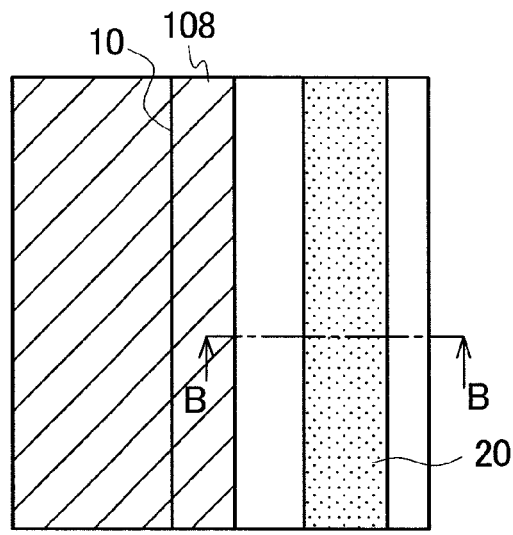
FIG. 4A shows a conventional example corresponding to FIG. 3A.
Figure 4B:
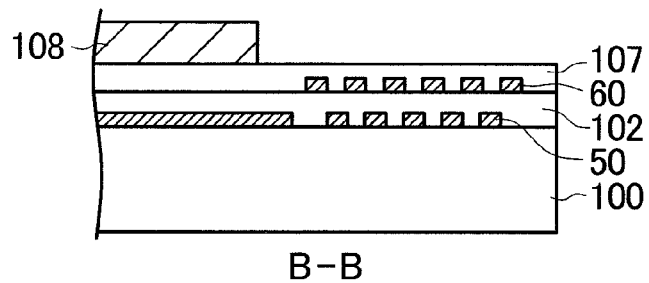
FIG. 4B shows the conventional example corresponding to FIG. 3B.
Figure 4C:
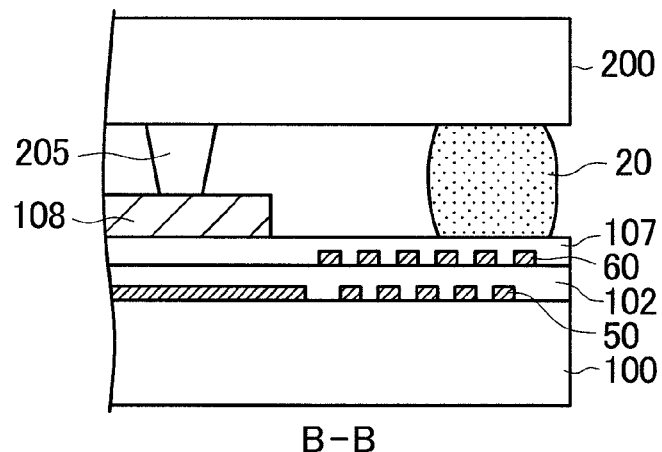
FIG. 4C shows the conventional example corresponding to FIG. 3C.

FIGS. 4A to 4C show a portion corresponding to the A portion of FIG. 1 in a conventional example. FIG. 4A is a plan view. In FIG. 4A, not-shown glass fibers are dispersed in the sealing material 20, so that the gap between the TFT substrate 100 and the counter substrate 200 is defined by the diameter of the glass fiber. In FIG. 4A, the organic passivation film 108 exists to the outside of the display region 10 but does not exist below the sealing material 20.

FIG. 4B is a cross-sectional view of the TFT substrate 100 taken along line B-B of FIG. 4A. FIG. 4B is similar to FIG. 3B except that the organic passivation film 108 is not formed in the seal portion. FIG. 4C is another cross-sectional view taken along the line B-B of FIG. 4A. In FIG. 4C, the not-shown glass fibers are dispersed in the seal portion.

On the other hand, the first scanning line lead wires 50 and the second scanning line lead wires 60 exist in the seal portion of the TFT substrate 100. Therefore, not-shown irregularities are formed on the surface of the inorganic passivation film 107. When the irregularities are pressed by hard glass fibers, there arises a risk that the inorganic passivation film 107 or the gate insulating film 102, and the first scanning line lead wires 50 or the second scanning line lead wires 60 will be broken.

Contrary to this, in the seal portion of the invention, the column spacer 205 is an organic material and in contact with the TFT substrate 100 via the organic passivation film 108. Therefore, even if a pressure is applied when the TFT substrate 100 and the counter substrate 200 are bonded together, the film such as the inorganic passivation film 107 formed on the TFT substrate 100 is not broken. Accordingly, the invention can precisely define the gap between the TFT substrate 100 and the counter substrate 200, improve the adhesive force of the sealing material 20 to the TFT substrate 100, and further does not break the insulating film or conductive film formed on the TFT substrate 100. Therefore, the reliability of the seal portion can be improved.

Figure 5A:
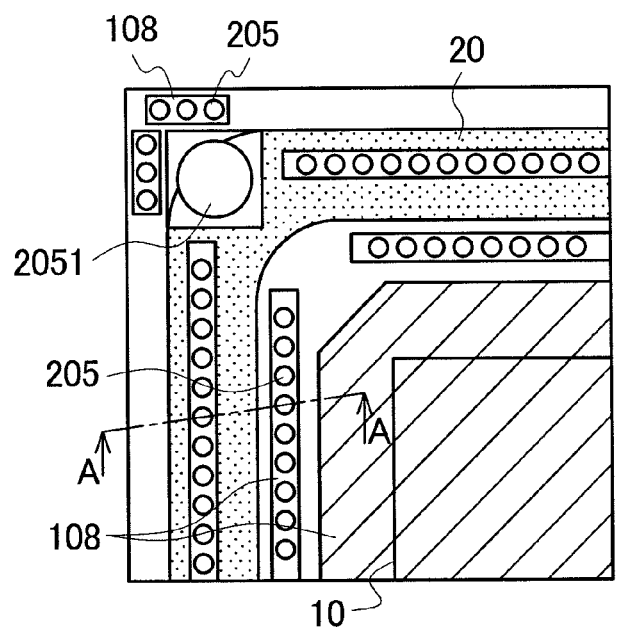
FIG. 5A shows a second shape of the seal portion in Embodiment 1.
Figure 5B:
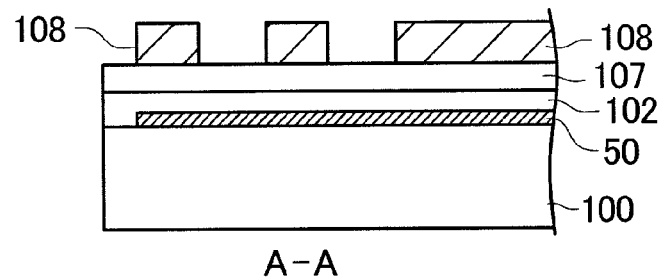
FIG. 5B shows the second shape of the seal portion in Embodiment 1.
Figure 5C:
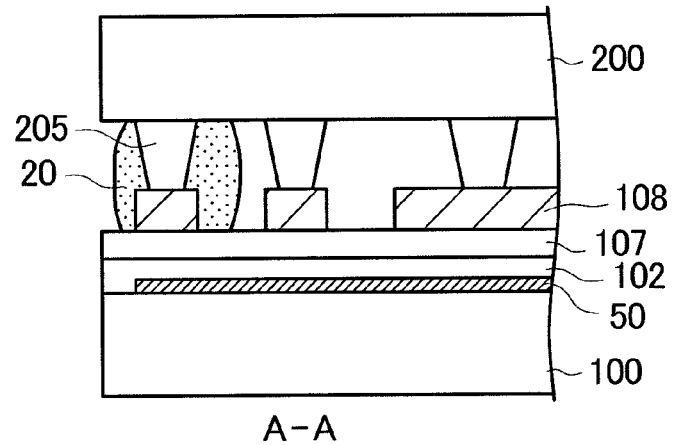
FIG. 5C shows the second shape of the seal portion in Embodiment 1.

FIGS. 5A to 5C show a B portion in FIG. 1, that is, a seal portion at an upper left corner portion. FIG. 5A is a plan view. In FIG. 5A, a large column spacer 2051 having a large area is formed at the corner portion. Since an external force is likely to be applied to a corner, the large column spacer 2051 is used. Even the large column spacer 2051 has the same height as that of the column spacer 205. Further at the corner portion, the column spacer 205 and the organic passivation film 108 corresponding thereto are also formed outside the sealing material 20 for moderating the external force applied to the corner portion.

FIG. 5B is a cross-sectional view taken along line A-A of FIG. 5A, only illustrating the TFT substrate 100. In FIG. 5B, the scanning line lead wires are formed on the gate insulating film 102 of the TFT substrate 100. Since this portion corresponds to the uppermost portion of the display region 10, the scanning line lead wires extend only in the lateral direction.

FIG. 5C is another cross-sectional view taken along the line A-A of FIG. 5A. FIG. 5C shows the state where the counter substrate 200 having the column spacer 205 formed thereon is bonded to the TFT substrate 100 in FIG. 5B via the sealing material 20. In FIG. 5C, the sealing material 20 is in contact with the inorganic passivation film 107 on the TFT substrate 100 side, so that the reliability of the seal portion is improved, as described with reference to FIGS. 3A to 3C.

Figure 6A:
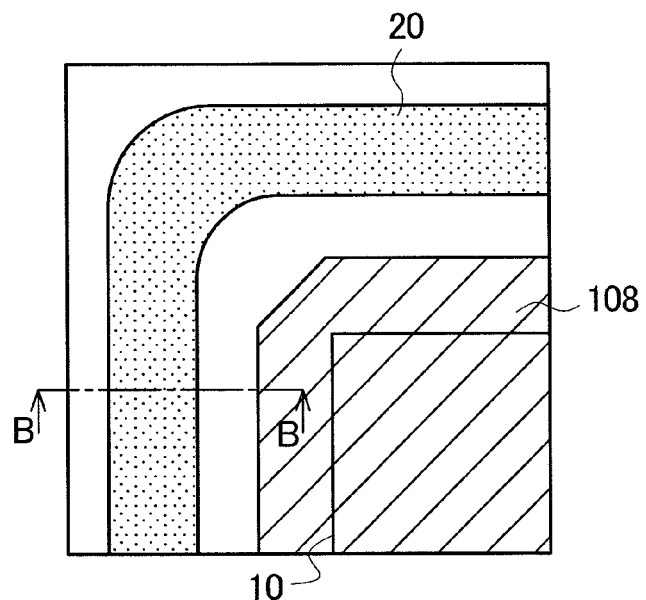
FIG. 6A shows the conventional example corresponding to FIG. 5A.
Figure 6B:
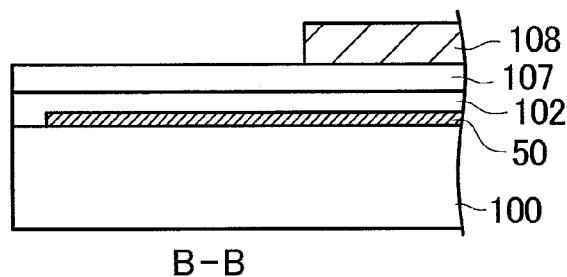
FIG. 6B shows the conventional example corresponding to FIG. 5B.
Figure 6C:
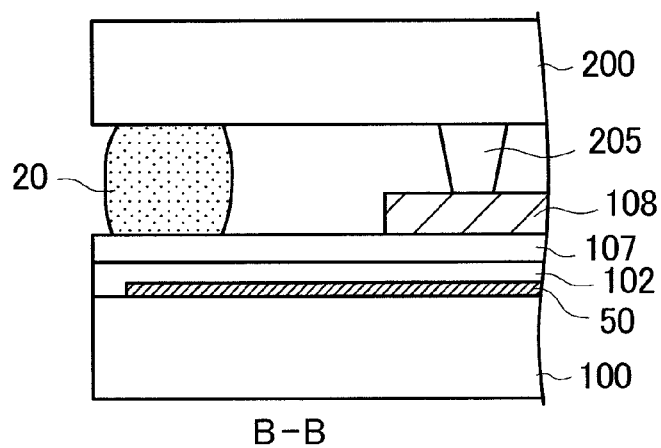
FIG. 6C shows the conventional example corresponding to FIG. 5C.

FIGS. 6A to 6C show a conventional example in contrast with FIGS. 5A to 5C. FIG. 6A is a plan view. In FIG. 6A, the organic passivation film 108 exists to the outside of the display region 10 but does not exist in the seal portion. Not-shown glass fibers are dispersed in the sealing material 20 in FIG. 6A, as described with reference to FIGS. 4A to 4C.

FIG. 6B is a cross-sectional view of the TFT substrate 100 taken along line B-B of FIG. 6A. In FIG. 6B, the organic passivation film 108 does not exist at the periphery of the TFT substrate 100. FIG. 6C is another cross-sectional view taken along the line B-B of FIG. 6A. The column spacer 205 is formed only in the display region 10 but not formed in the seal portion. The gap between the TFT substrate 100 and the counter substrate 200 in the seal portion is defined by the glass fibers.

Figure 7A:
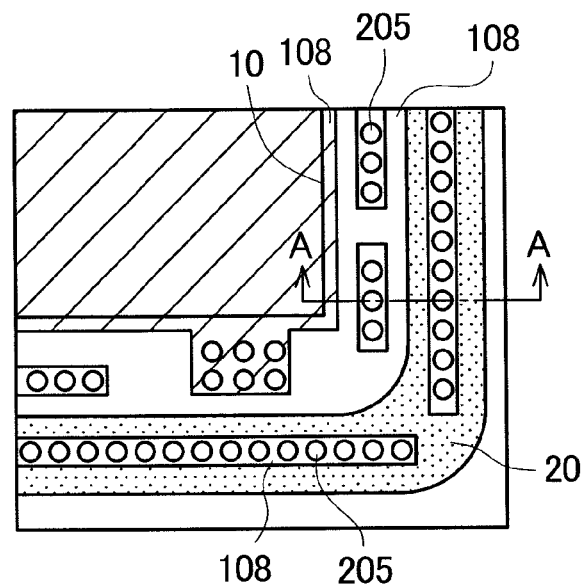
FIG. 7A shows a third shape of the seal portion in Embodiment 1.
Figure 7B:
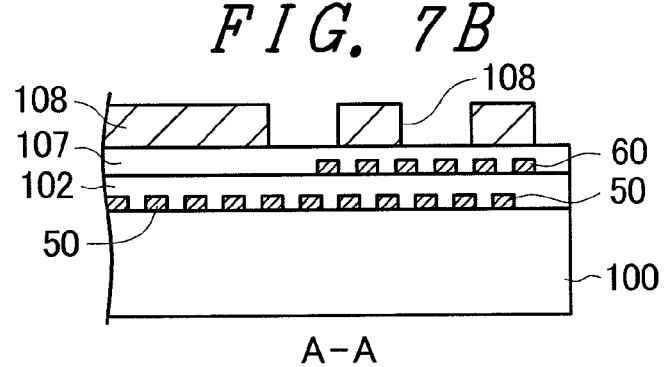
FIG. 7B shows the third shape of the seal portion in Embodiment 1.
Figure 7C:
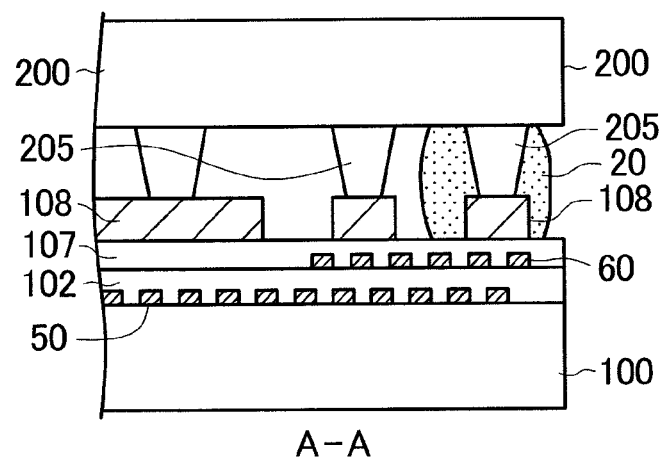
FIG. 7C shows the third shape of the seal portion in Embodiment 1.

FIGS. 7A to 7C show a C portion in FIG. 1, that is, the seal portion at a lower right corner portion. FIG. 7A is a plan view. In FIG. 7A, the column spacer 205 and the organic passivation film 108 corresponding thereto are formed in the sealing material 20. The column spacer 205 and the organic passivation film 108 corresponding thereto are formed also between the sealing material 20 and the display region 10.

FIG. 7B is a cross-sectional view taken along line A-A of FIG. 7A, only illustrating the TFT substrate 100. In FIG. 7B, the scanning line lead wires are formed on the gate insulating film 102 and the inorganic passivation film 107 of the TFT substrate 100. FIG. 7C is another cross-sectional view taken along the line A-A of FIG. 7A. FIG. 7C shows the state where the counter substrate 200 having the column spacer 205 formed thereon is bonded to the TFT substrate 100 in FIG. 7B via the sealing material 20. In FIG. 7C, the sealing material 20 is in contact with the inorganic passivation film 107 on the TFT substrate 100 side, so that the reliability of the seal portion is improved, as described with reference to FIGS. 3A to 3C.

Figure 8A:
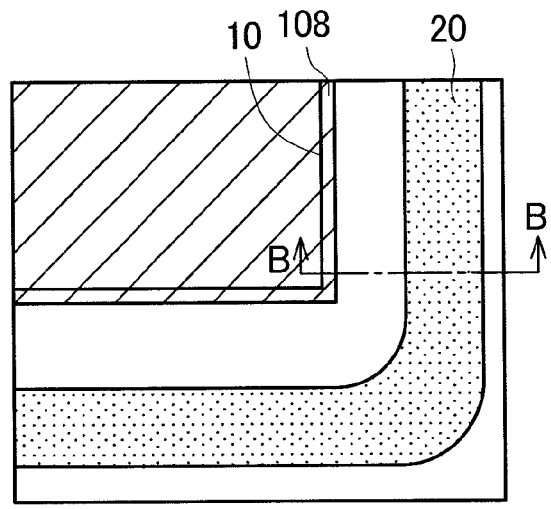
FIG. 8A shows the conventional example corresponding to FIG. 7A.
Figure 8B:
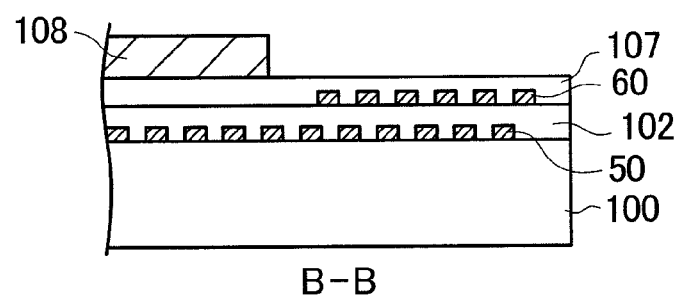
FIG. 8B shows the conventional example corresponding to FIG. 7B.
Figure 8C:
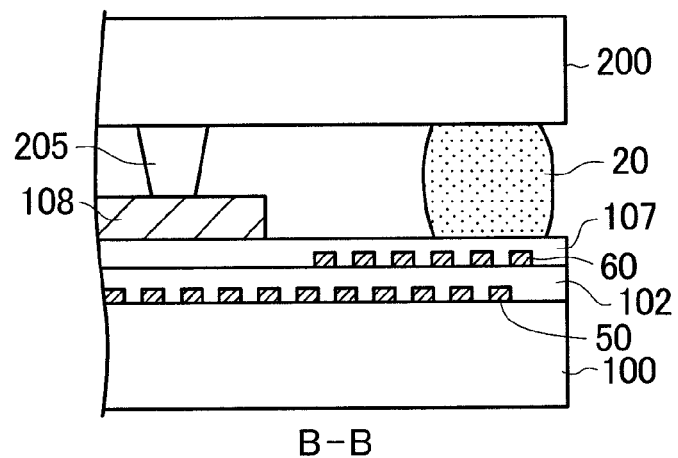
FIG. 8C shows the conventional example corresponding to FIG. 7C.

FIGS. 8A to 8C show a conventional example in contrast with FIGS. 7A to 7C. FIG. 8A is a plan view. In FIG. 8A, the organic passivation film 108 exists to the outside of the display region 10 but does not extend to the seal portion. Glass fibers are dispersed in the sealing material 20 in FIG. 8A, as described with reference to FIGS. 4A to 4C.

FIG. 8B is a cross-sectional view of the TFT substrate 100 taken along line A-A of FIG. 8A. In FIG. 8B, the organic passivation film 108 does not exist at the periphery of the TFT substrate 100. FIG. 8C is another cross-sectional view taken along the line B-B of FIG. 8A. The column spacer 205 is formed only in the display region 10 but not formed in the seal portion. The gap between the TFT substrate 100 and the counter substrate 200 in the seal portion is defined by the glass fibers.

Figure 9:
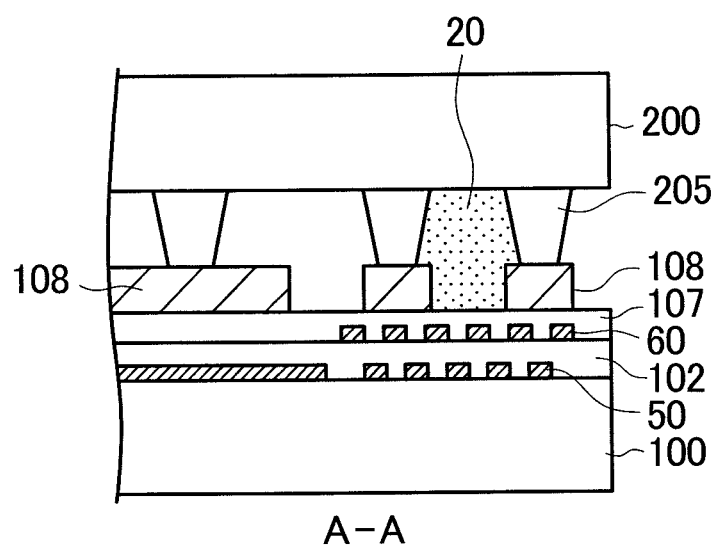
FIG. 9 shows a fourth shape of the seal portion in Embodiment 1.

In FIGS. 3A to 3C, 5A to 5C, 7A to 7C, and the like, the sealing material 20 is formed so as to surround the outside column spacer 205. However, the sealing material 20 is not necessarily limited to the configuration of surrounding the column spacer 205 on the outermost side. FIG. 9 shows an example where the sealing material 20 is formed between the outermost-side column spacer 205 and the column spacer 205 present inside the outermost-side column spacer 205. Also in this case, the sealing material 20 is in contact with an SiN film as the inorganic passivation film 107 on the TFT substrate 100 side, so that the reliability of the seal portion is improved.

Figure 10A:
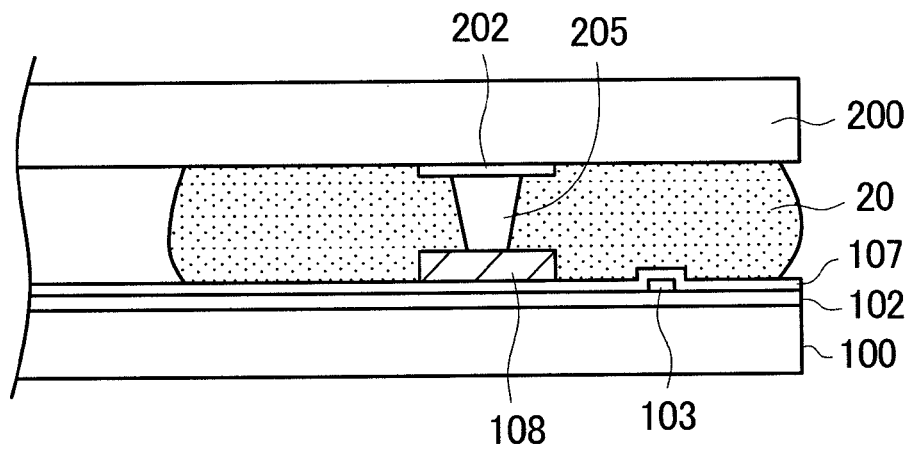
FIG. 10A shows a first configuration in which a seal portion is roughened to improve adhesive force.

FIGS. 10A to 12B show the configurations in which the reliability of the seal portion is further improved. In FIGS. 10A and 10B, a-Si and n+Si layers are formed like islands outside the column spacer 205 in the seal portion, so that a similar effect to that of roughening the top of the inorganic passivation film 107 is provided to improve the adhesive properties between the sealing material 20 and the TFT substrate 100.

FIG. 10A is a cross-sectional view of the seal portion. In the seal portion, the column spacer 205 is formed. The column spacer 205 is formed on the black matrix 202 formed like an island. Whether the column spacer 205 is formed on the black matrix 202, on the black matrix 202 and on the overcoat film, or on a stacked fluorescent substance may be determined in view of the gap between the TFT substrate 100 and the counter substrate 200 in the display region 10.

A protrusion 1031 is formed by forming an a-Si layer like an island outside the column spacer 205. The island-like a-Si protrusion 1031 is formed on the gate insulating film 102. The inorganic passivation film 107 is coated on the island-like a-Si protrusion 1031. As a result, a similar effect to that of roughening the top of the inorganic passivation film 107 is provided, and a contact area is increased, whereby the adhesive force of the sealing material 20 is increased to improve the reliability of the seal portion.

Figure 10B:
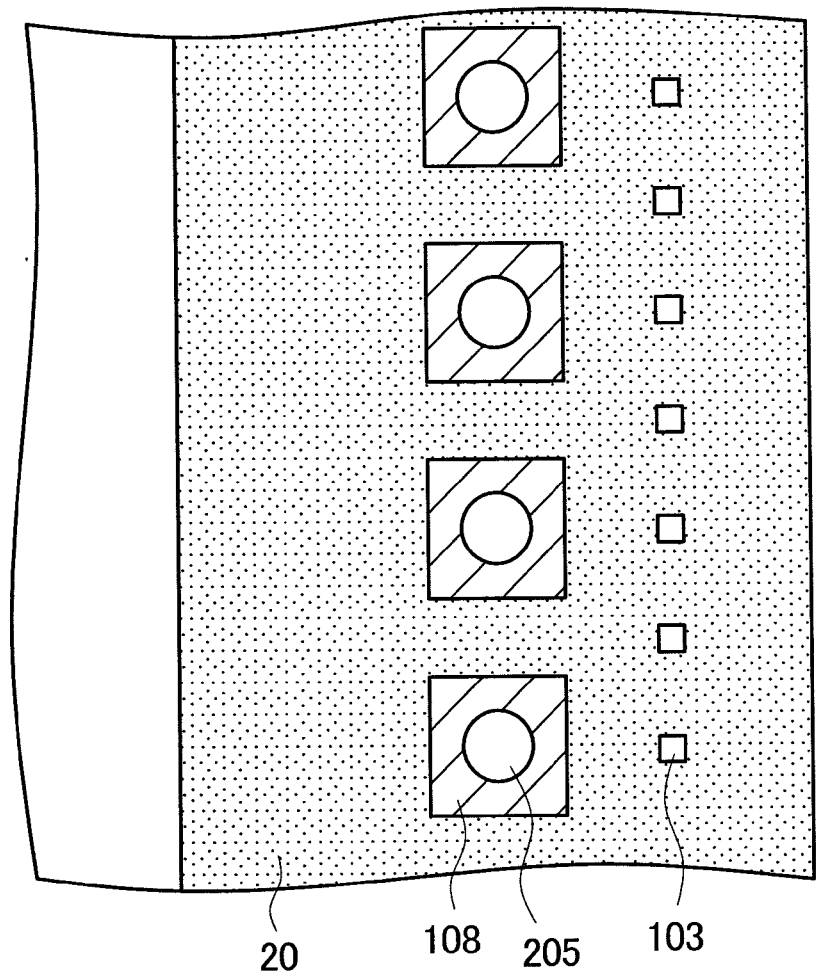
FIG. 10B shows the first configuration in which the seal portion is roughened to improve adhesive force.

FIG. 10B is a plan view of the seal portion, in which the column spacer 205 is formed in the seal portion, and the island-like a-Si protrusions 1031 are formed in a line outside the column spacer 205. FIG. 10B shows an example of the arrangement of the island-like a-Si protrusion 1031. The pitch between the island-like a-Si protrusions 1031 may be smaller or greater than that of the example. The arrangement of the island-like a-Si protrusion 1031 is not limited to the in-line arrangement. The island-like a-Si protrusion 1031 may be arranged randomly.

In FIGS. 10A and 10B and the like, the protrusion is represented by the a-Si protrusion 1031. However, the n+Si layer formed on the a-Si layer may be simultaneously formed as the island-like protrusion 1031. The island-like protrusion can be formed with the a-Si and n+Si layers in the seal portion at the same time when patterning is performed in the display region 10. The thickness of the a-Si layer is about 150 nm, and the thickness of the n+Si layer is about 25 nm.

Figure 11A:
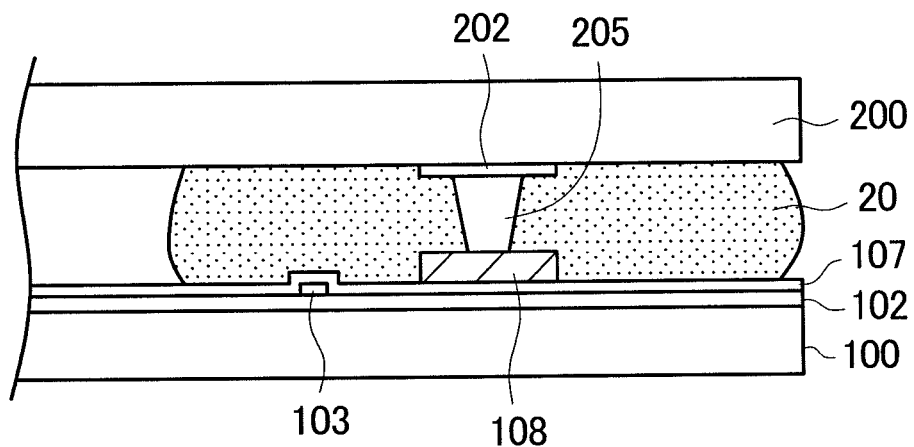
FIG. 11A shows a second configuration in which a seal portion is roughened to improve adhesive force.
Figure 11B:
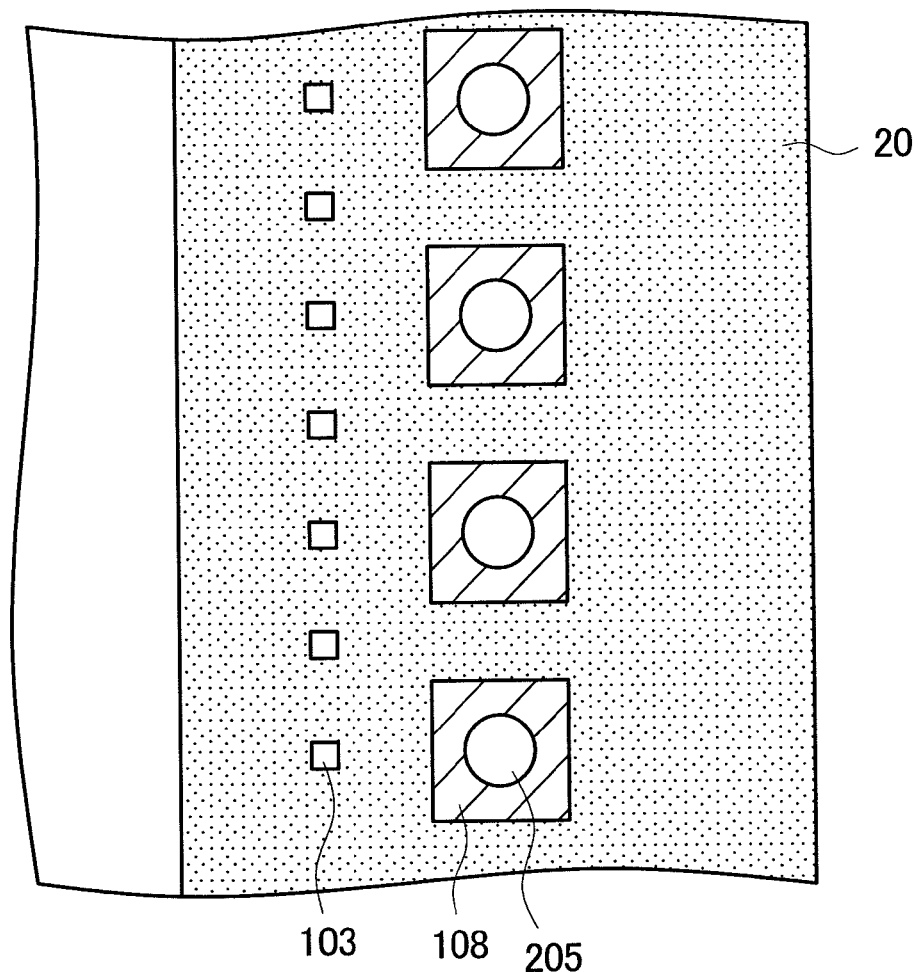
FIG. 11B shows the second configuration in which the seal portion is roughened to improve adhesive force.

In FIGS. 11A and 11B, a-Si and n+Si layers are formed like islands inside the column spacer 205 in the seal portion, so that a similar effect to that of roughening the top of the inorganic passivation film 107 is provided to improve the adhesive properties between the sealing material 20 and the TFT substrate 100. FIG. 11A is a cross-sectional view of the seal portion. FIG. 11B is a plan view of the seal portion.

The configuration shown in FIGS. 11A and 11B is similar to that shown in FIGS. 10A and 10B except that the island-like protrusion 1031 formed of a-Si is formed inside the column spacer 205 in the seal portion. Even when the protrusion 1031 is formed inside the column spacer 205 as shown in FIGS. 11A and 11B, the adhesive force of the sealing material 20 and TFT substrate 100 can be improved, so that the reliability of the seal portion is improved.

Figure 12A:
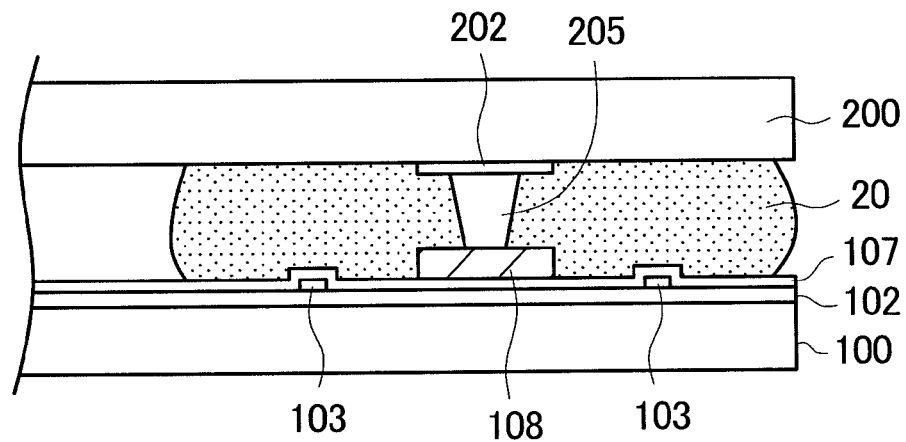
FIG. 12A shows a third configuration in which a seal portion is roughened to improve adhesive force.
Figure 12B:
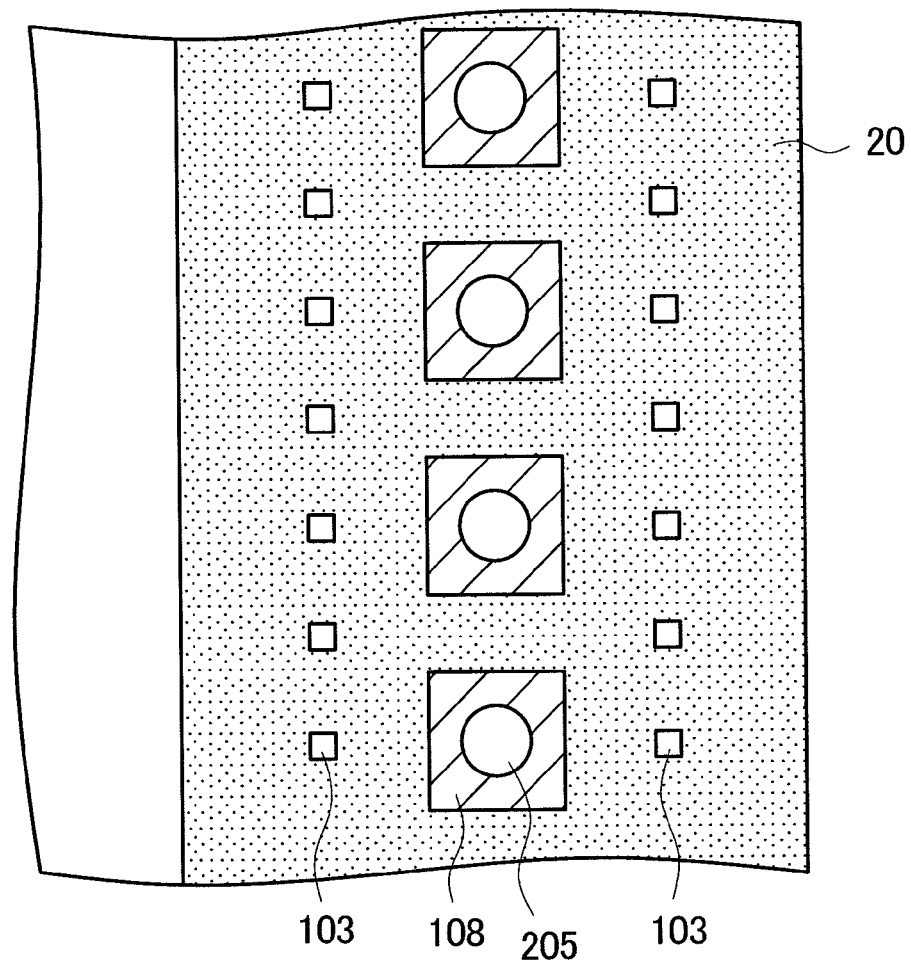
FIG. 12B shows the third configuration in which the seal portion is roughened to improve adhesive force.

In FIGS. 12A and 12B, a-Si and n+Si layers are formed like islands on both sides of the column spacer 205 in the seal portion, so that a similar effect to that of roughening the top of the inorganic passivation film 107 is provided to improve the adhesive properties between the sealing material 20 and the TFT substrate 100. FIG. 12A is a cross-sectional view of the seal portion. FIG. 12B is a plan view of the seal portion.

The configuration shown in FIGS. 12A and 12B is similar to that shown in FIGS. 10A and 10B except that the island-like protrusions 1031 formed of a-Si are formed on both sides of the column spacer 205 in the seal portion. The protrusions 1031 are formed on both sides of the column spacer 205 as shown in FIGS. 12A and 12B, so that the adhesive force of the sealing material 20 and the TFT substrate 100 can be further improved, and the reliability of the seal portion is improved.

Figure 13A:
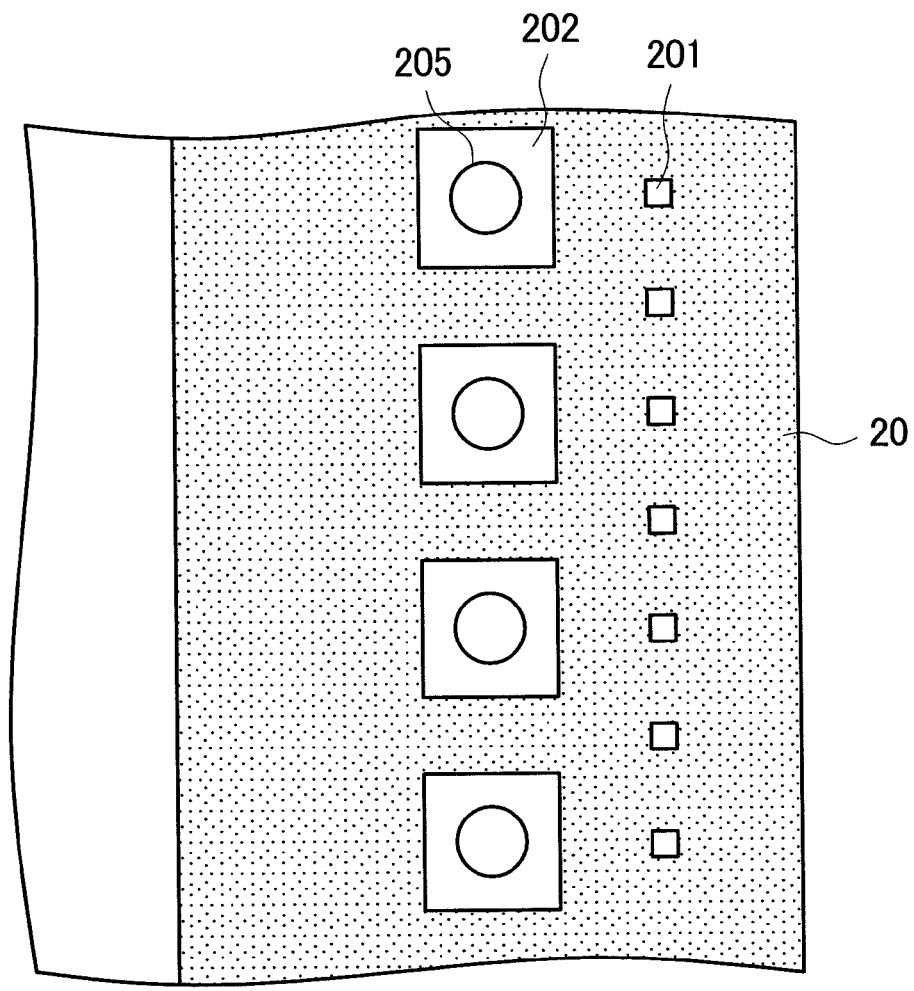
FIG. 13A shows a fourth configuration in which a seal portion is roughened to improve adhesive force.

FIGS. 13A to 15B show other examples of the configurations in which the reliability of the seal portion is improved. In FIGS. 13A and 13B, a color filter protrusion 2011 is formed by forming a color filter like an island outside the column spacer 205 in the seal portion, so that a contact area of the sealing material 20 with the counter substrate 200 is increased. Thus, the adhesive force of the sealing material 20 to the counter substrate 200 is increased to improve the reliability of the seal portion.

FIG. 13A is a plan view of the seal portion. In the seal portion, the column spacers 205 are formed. The protrusions 2011 are formed outside the column spacers 205 by forming the color filters like islands. The island-like color filter protrusion 2011 may be formed on the black matrix 202 or may be directly formed on the glass substrate. The thickness of the color filter is from 1 μm to 2 μm, and the protrusion 2011 formed of the color filter is greater than the protrusion 1031 formed of a-Si or the like in the TFT substrate 100. Therefore, a larger roughening effect can be provided.

Figure 13B:
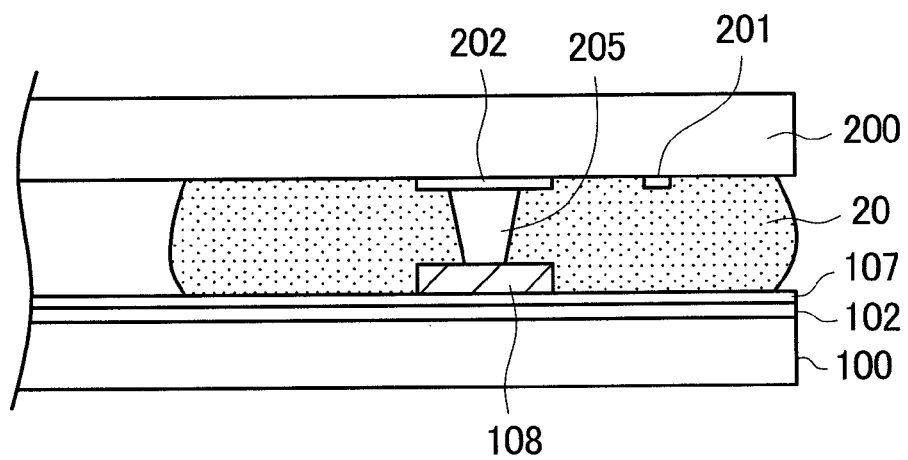
FIG. 13B shows the fourth configuration in which the seal portion is roughened to improve adhesive force.

FIG. 13B is a cross-sectional view of the seal portion, showing an example where the column spacer 205 is formed on the island-like black matrix 202. Although an island-like fluorescent substance is directly formed on the glass substrate, BM may be arranged as a base depending on the requirements of the processes or the like.

Figure 14A:
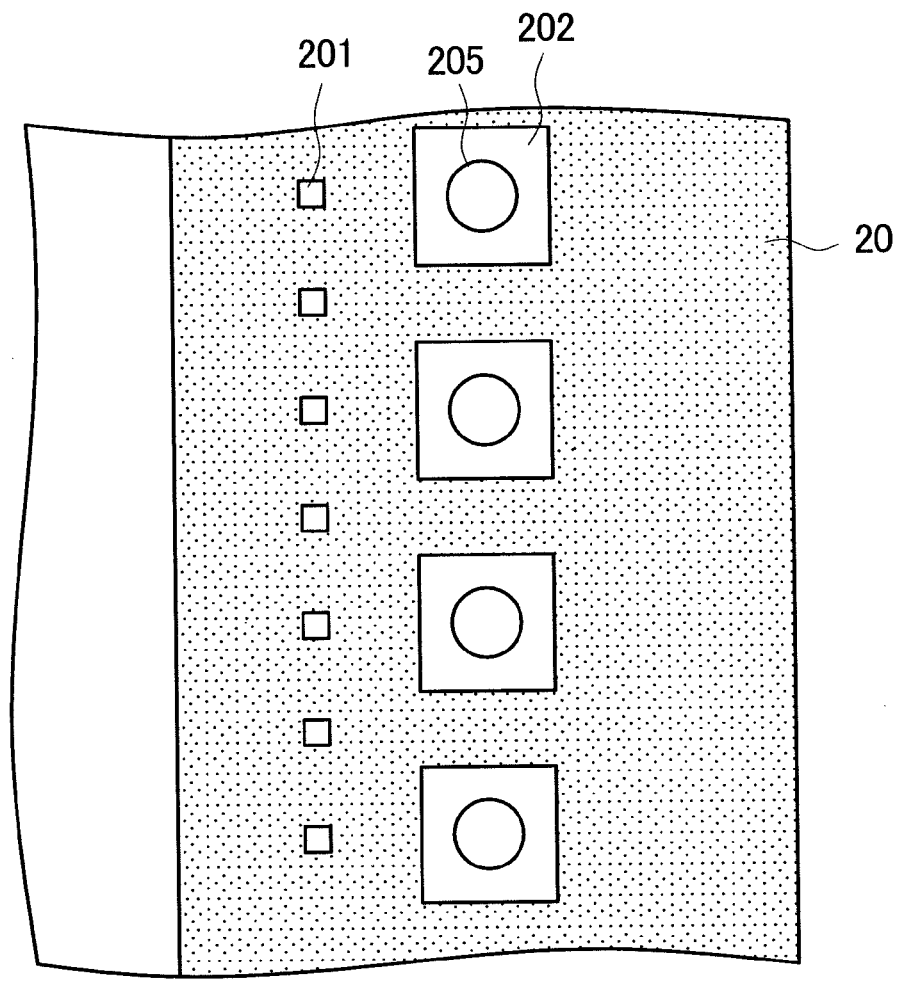
FIG. 14A shows a fifth configuration in which a seal portion is roughened to improve adhesive force.
Figure 14B:
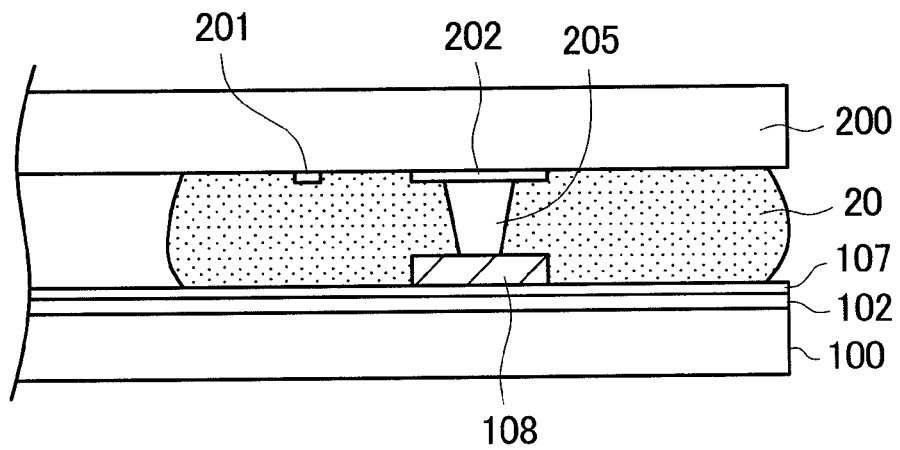
FIG. 14B shows the fifth configuration in which the seal portion is roughened to improve adhesive force.

FIGS. 14A and 14B show an example where the island-like color filters 2011 are arranged inside the column spacers 205 in the seal portion. FIG. 14A is a plan view, while FIG. 14B is a cross-sectional view. Since FIGS. 14A and 14B are similar to FIGS. 13A and 13B except that the island-like color filters 2011 are formed inside the column spacers 205, the description is omitted.

Figure 15A:
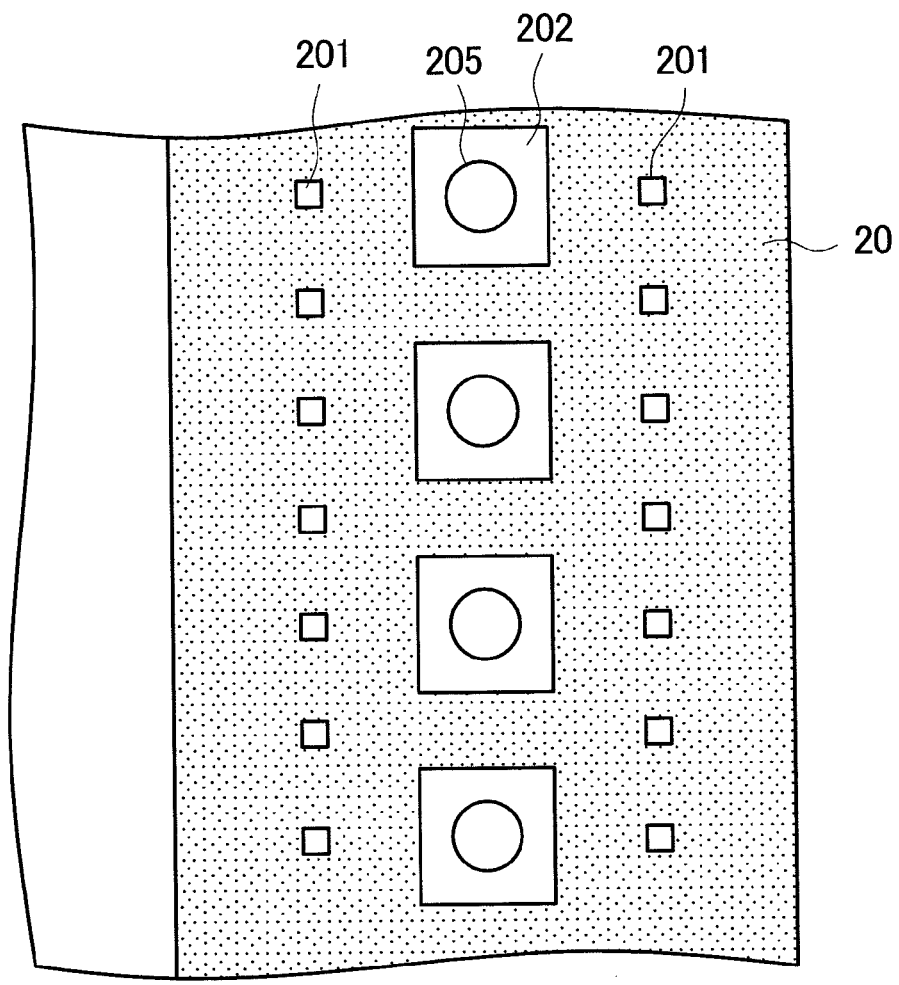
FIG. 15A shows a sixth configuration in which a seal portion is roughened to improve adhesive force.
Figure 15B:
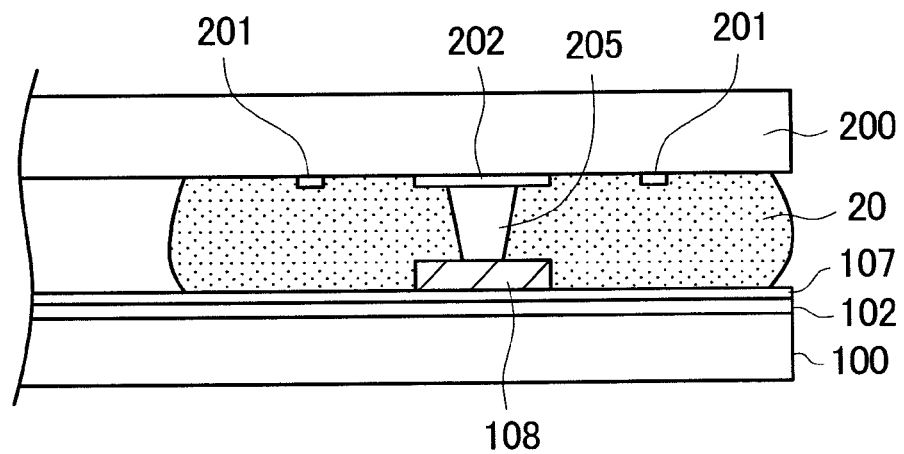
FIG. 15B shows the sixth configuration in which the seal portion is roughened to improve adhesive force.

FIGS. 15A and 15B show an example where the island-like color filters 2011 are formed on both sides of the column spacers 205 in the seal portion. FIG. 15A is a plan view, while FIG. 15B is a cross-sectional view. Since FIGS. 15A and 15B are similar to FIGS. 13A and 13B except that the island-like color filters 2011 are formed on both sides of the column spacers 205, the description is omitted. In the example of FIGS. 15A and 15B, since an area for roughening the counter substrate 200 is large, the adhesive properties between the sealing material 20 and the counter substrate 200 can be further improved.

Embodiment 2

In Embodiment 1, the TN type liquid crystal display device, which is most typical, has been described. However, the invention is not limited to the TN type liquid crystal display device but can be applied to other types. An IPS (In Plane Switching) type liquid crystal display device controls light by rotating liquid crystal molecules 301 in the horizontal direction with a lateral electric field and has excellent viewing angle characteristics.

Figure 16:
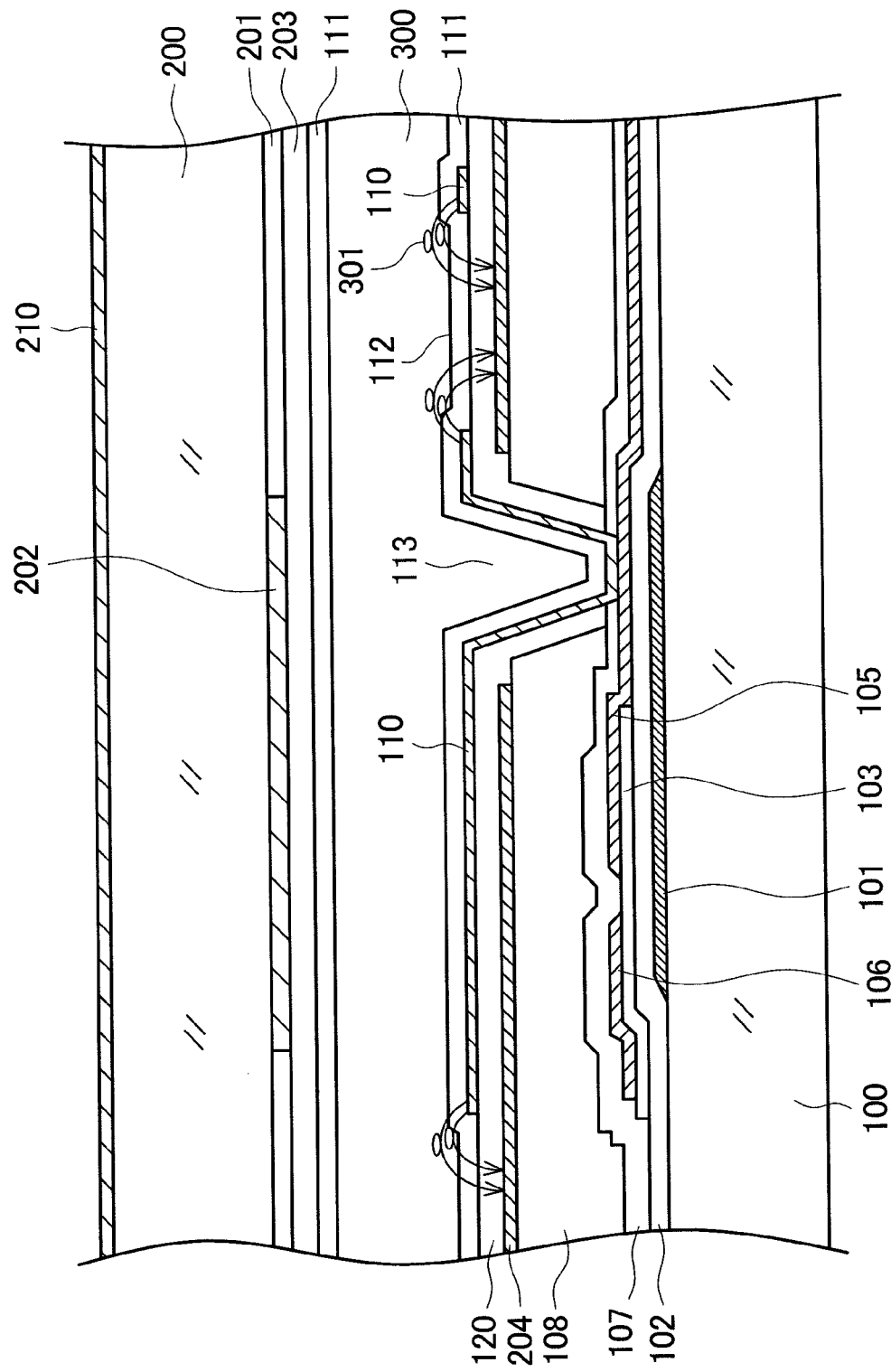
FIG. 16 is a cross-sectional view of a display region of a liquid crystal display device of Embodiment 2.

FIG. 16 is a cross-sectional view of the display region 10 of an IPS type liquid crystal display device. Only different portions from the configuration of the typical liquid crystal display device described with reference to FIG. 2 will be described. In FIG. 16, a TFT is formed on the TFT substrate 100, and the organic passivation film 108 is formed on the inorganic passivation film 107, similarly to FIG. 2. An n+Si layer is formed on the semiconductor layer 103, but the n+Si layer is omitted in FIG. 16.

In FIG. 16, the counter electrode 204 is formed of ITO in a planar shape on the organic passivation film 108. An inter-layer insulating film 120 is formed on the counter electrode 204. The pixel electrode 110 having a comb-teeth shape is formed on the inter-layer insulating film 120. When voltage due to a video signal is applied to the comb-teeth electrode, and a reference voltage is applied to the counter electrode 204, lines of electric force indicated by arrows in FIG. 16 are generated to rotate the liquid crystal molecules 301, thereby controlling the amount of light transmitting through the liquid crystal layer 300. The alignment film 111 is formed on the pixel electrode 110.

In FIG. 16, the black matrix 202, the color filters 201, and the overcoat film 203 are formed on the counter substrate 200 similarly to FIG. 2. In FIG. 16, the alignment film 111 is formed on the overcoat film 203. The counter electrode 204 is not formed on the counter substrate 200. This is because the counter electrode 204 is formed on the TFT substrate 100 in the IPS type liquid crystal display device.

In the IPS type liquid crystal display device, since the counter electrode 204 is not formed on the counter substrate 200, noise from the outside enters from the counter substrate 200 side. For preventing this, a surface conductive film 210 is formed to shield the inside of the IPS type liquid crystal display device.

FIGS. 17A to 17C, 19A to 19C, and 21A to 21C are enlarged views of the seal portions corresponding to the regions A, B, and C in FIG. 1 in the seal portion when the invention is applied to the IPS type liquid crystal display device.

Figure 17A:
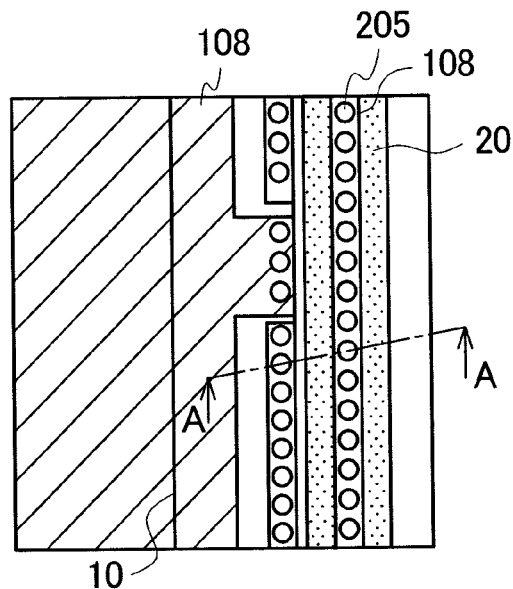
FIG. 17A shows a first shape of the seal portion in Embodiment 2.
Figure 17B:
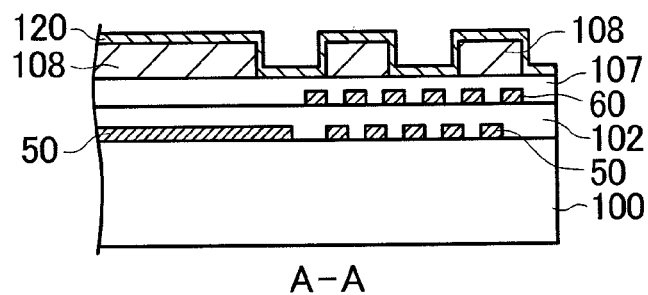
FIG. 17B shows the first shape of the seal portion in Embodiment 2.
Figure 17C:
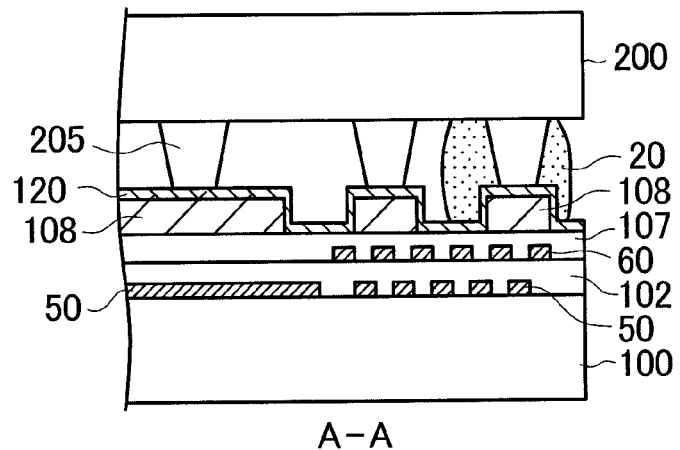
FIG. 17C shows the first shape of the seal portion in Embodiment 2.

FIGS. 17A to 17C are enlarged views of the region A in FIG. 1. FIG. 17A is a plan view. FIG. 17A is similar to FIG. 3A, but the inter-layer insulating film 120, which is not shown, is formed on the organic passivation film 108. FIG. 17B is a cross-sectional view of the TFT substrate 100 portion taken along line A-A of FIG. 17A. In FIG. 17B, the inter-layer insulating film 120 is formed on the organic passivation film 108 and the inorganic passivation film 107.

Since the inter-layer insulating film 120 is formed of an SiN film as an inorganic film, the inter-layer insulating film 120 has excellent adhesive properties to the sealing material 20. Accordingly, the reliability of the seal portion can be further improved compared with the typical TN type liquid crystal display device described with reference to FIGS. 3A to 3C and the like.

FIG. 17C is another cross-sectional view taken along the line A-A of FIG. 17A. As shown in FIG. 17C, the column spacers 205 are in contact with the inter-layer insulating film 120 formed on the organic passivation film 108. Since the sealing material 20 is in contact with the inter-layer insulating film 120 as an inorganic film and is not contact with the organic passivation film 108 on the TFT substrate 100 side, the reliability of the seal portion is extremely high.

Figure 18A:
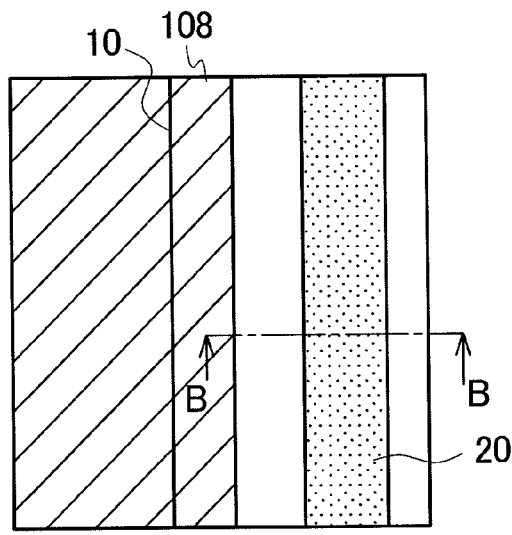
FIG. 18A shows the conventional example corresponding to FIG. 17A.
Figure 18B:
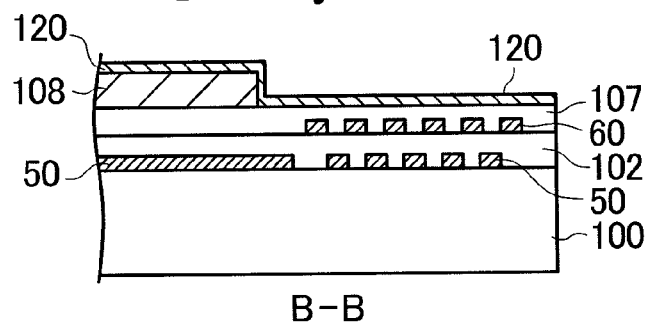
FIG. 18B shows the conventional example corresponding to FIG. 17B.
Figure 18C:
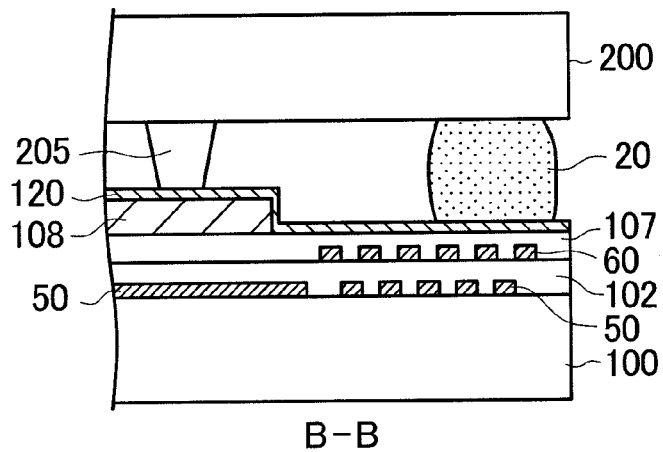
FIG. 18C shows the conventional example corresponding to FIG. 17C.

FIGS. 18A to 18C show a conventional example for the same portion as in FIGS. 17A to 17C for comparison. FIG. 18A is a plan view. FIG. 18B is a cross-sectional view taken along line B-B of FIG. 18A, showing only the portion of the TFT substrate 100. FIG. 18C is another cross-sectional view taken along the line A-A of FIG. 18A. Since FIGS. 18A to 18C are similar to FIGS. 4A to 4C except that the inter-layer insulating film 120 is formed on the organic passivation film 108 and the inorganic passivation film 107, the description is omitted.

Figure 19A:
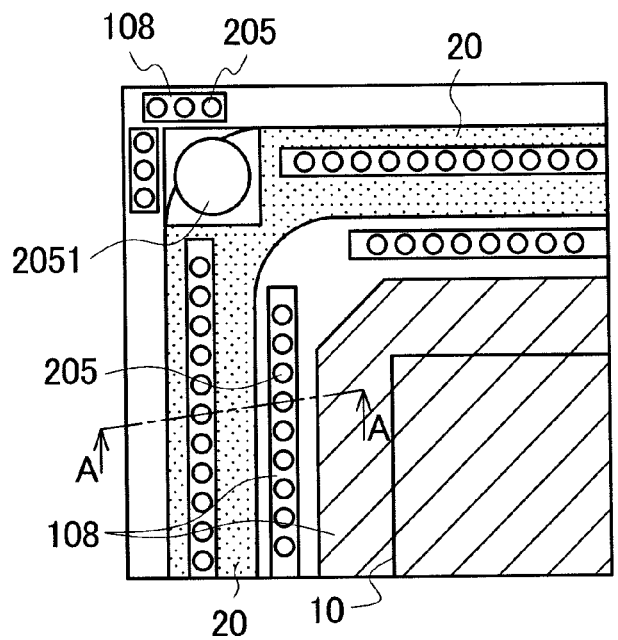
FIG. 19A shows a second shape of the seal portion in Embodiment 2.
Figure 19B:
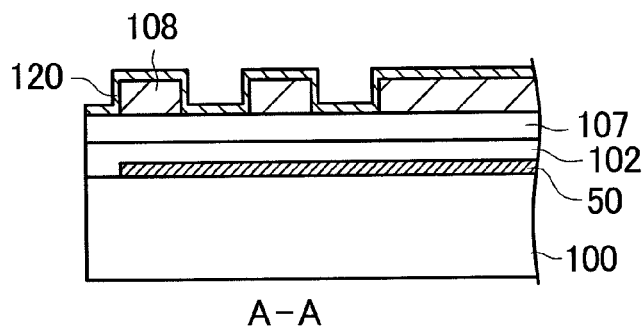
FIG. 19B shows the second shape of the seal portion in Embodiment 2.
Figure 19C:
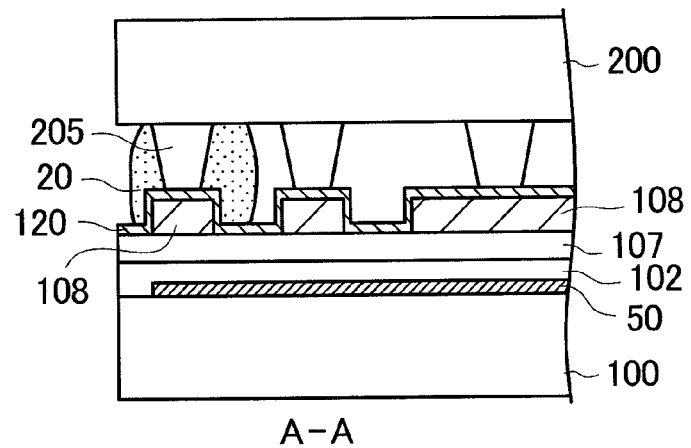
FIG. 19C shows the second shape of the seal portion in Embodiment 2.

FIGS. 19A to 19C are enlarged views of the region B in FIG. 1. FIG. 19A is a plan view. FIG. 19A is similar to FIG. 5A, but the inter-layer insulating film 120, which is not shown, is formed on the organic passivation film 108. FIG. 19B is a cross-sectional view of the TFT substrate 100 portion taken along line A-A of FIG. 19A. FIG. 19C is another cross-sectional view taken along the line A-A of FIG. 19A. Since FIGS. 19B, 19C, and the like are similar to FIGS. 5A to 5C except that the inter-layer insulating film 120 is formed on the organic passivation film 108 and the inorganic passivation film 107, the description is omitted.

Figure 20A:
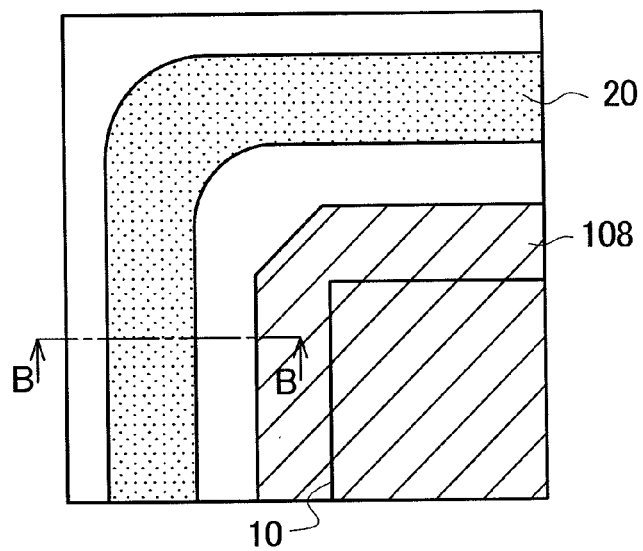
FIG. 20A shows the conventional example corresponding to FIG. 19A.
Figure 20B:
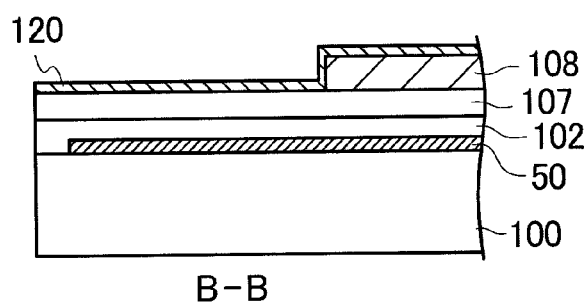
FIG. 20B shows the conventional example corresponding to FIG. 19B.
Figure 20C:
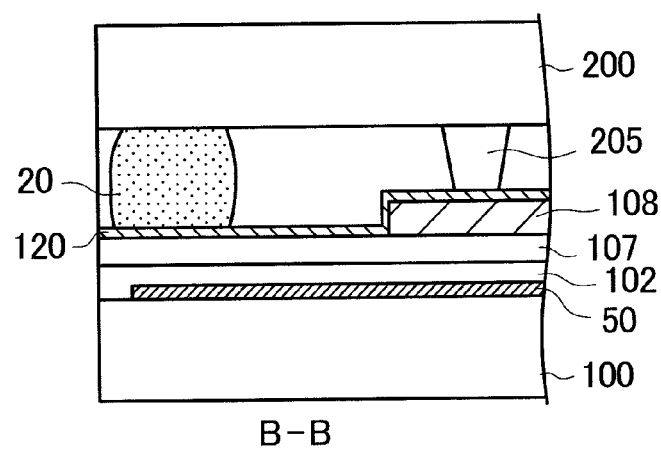
FIG. 20C shows the conventional example corresponding to FIG. 19C.

FIGS. 20A to 20C show a conventional example for the same portion as in FIGS. 19A to 19C for comparison. FIG. 20A is a plan view. FIG. 20B is a cross-sectional view taken along line B-B of FIG. 20A, showing only the portion of the TFT substrate 100. FIG. 20C is another cross-sectional view taken along the line B-B of FIG. 20A. Since FIGS. 20A to 20C are similar to FIGS. 6A to 6C except that the inter-layer insulating film 120 is formed on the organic passivation film 108 and the inorganic passivation film 107, the description is omitted.

Figure 21A:
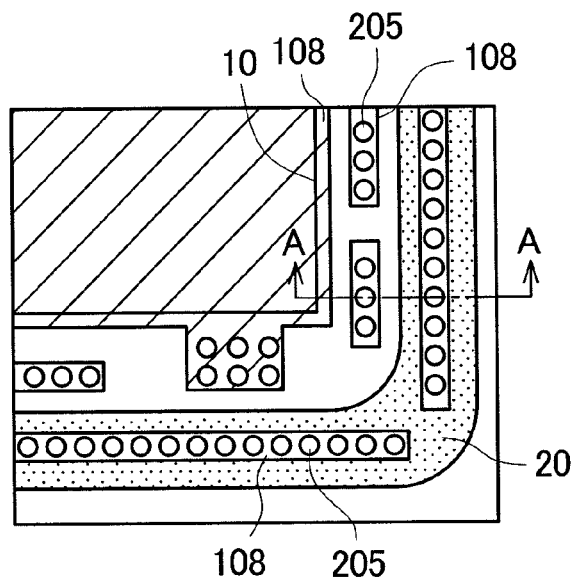
FIG. 21A shows a third shape of the seal portion in Embodiment 2.
Figure 21B:
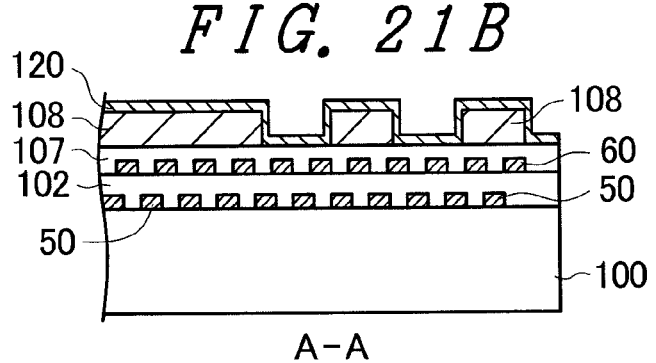
FIG. 21B shows the third shape of the seal portion in Embodiment 2.
Figure 21C:
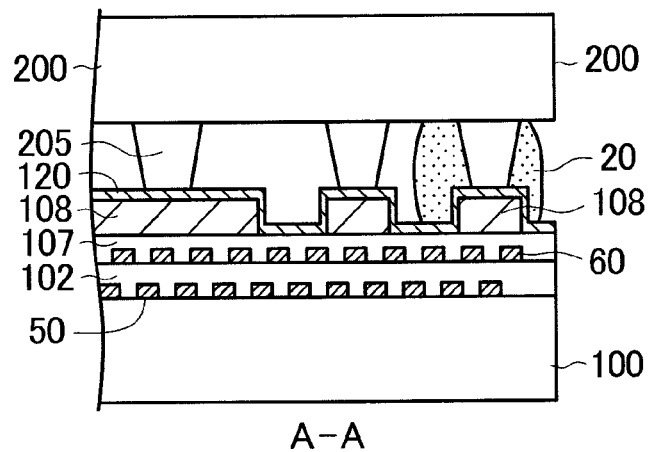
FIG. 21C shows the third shape of the seal portion in Embodiment 2.

FIGS. 21A to 21C are enlarged views of the region C in FIG. 1. FIG. 21A is a plan view. FIG. 21A is similar to FIG. 7A, but the inter-layer insulating film 120, which is not shown, is formed on the organic passivation film 108. FIG. 21B is a cross-sectional view of the TFT substrate 100 portion taken along line A-A of FIG. 21A. FIG. 21C is another cross-sectional view taken along the line A-A of FIG. 21A. Since FIG. 21B, 21C, and the like are similar to FIGS. 7A to 7C except that the inter-layer insulating film 120 is formed on the organic passivation film 108 and the inorganic passivation film 107, the description is omitted.

Figure 22A:
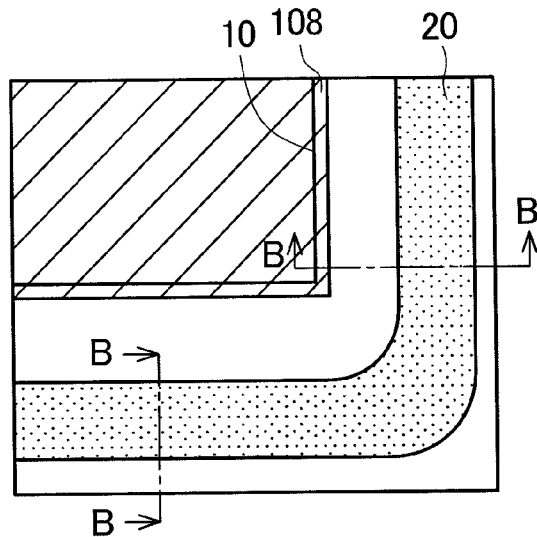
FIG. 22A shows the conventional example corresponding to FIG. 21A.
Figure 22B:
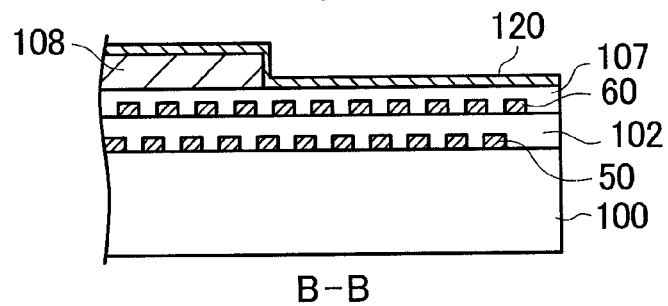
FIG. 22B shows the conventional example corresponding to FIG. 21B.
Figure 22C:
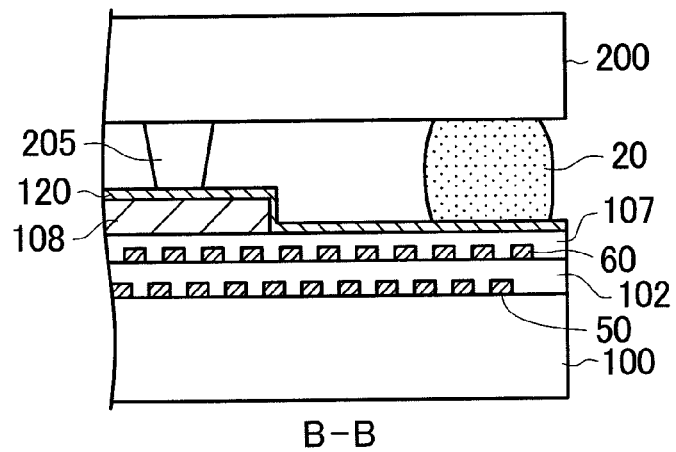
FIG. 22C shows the conventional example corresponding to FIG. 21C.

FIGS. 22A to 22C show a conventional example for the same portion as in FIGS. 21A to 21C for comparison. FIG. 22A is a plan view. FIG. 22B is a cross-sectional view taken along line B-B of FIG. 22A, showing only the portion of the TFT substrate 100. FIG. 22C is another cross-sectional view taken along the line B-B of FIG. 22A. Since FIGS. 22A to 22C are similar to FIGS. 8A to 8C except that the inter-layer insulating film 120 is formed on the organic passivation film 108 and the inorganic passivation film 107, the description is omitted.

Figure 23:
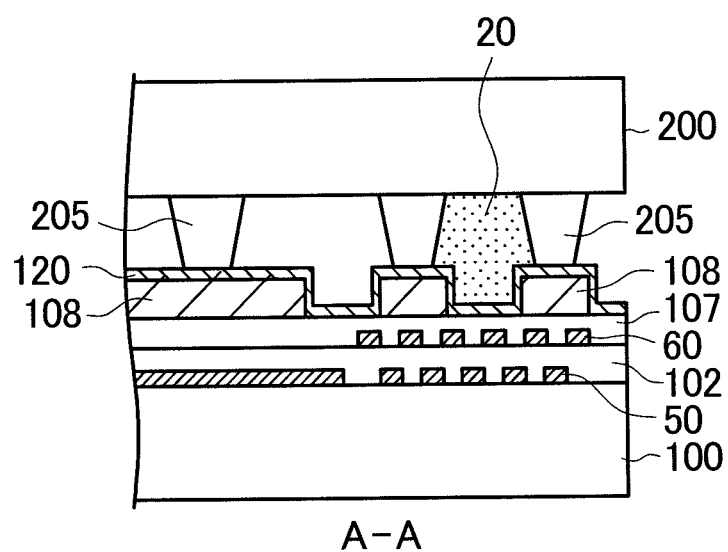
FIG. 23 shows a fourth shape of the seal portion in Embodiment 2.

In FIGS. 17A to 17C, 19A to 19C, 21A to 21C, and the like, the sealing material 20 is formed so as to surround the outside column spacers 205. However, the sealing material 20 is not necessarily limited to the configuration of surrounding the column spacer 205 on the outermost side. FIG. 23 shows an example where the sealing material 20 is formed between the outermost-side column spacer 205 and the column spacer 205 present inside the outermost-side column spacer 205. Also in this case, the sealing material 20 is in contact with an SiN film as the inter-layer insulating film 120 on the TFT substrate 100 side, so that the reliability of the seal portion is improved.

Embodiment 3

Embodiments 1 and 2 show the examples where the organic passivation film 108 is formed on the inorganic passivation film 107. Some liquid crystal display devices use only the inorganic passivation film 107 as a protective film for a TFT without using the organic passivation film 108. The invention can also be applied to such a case.

Figure 24:
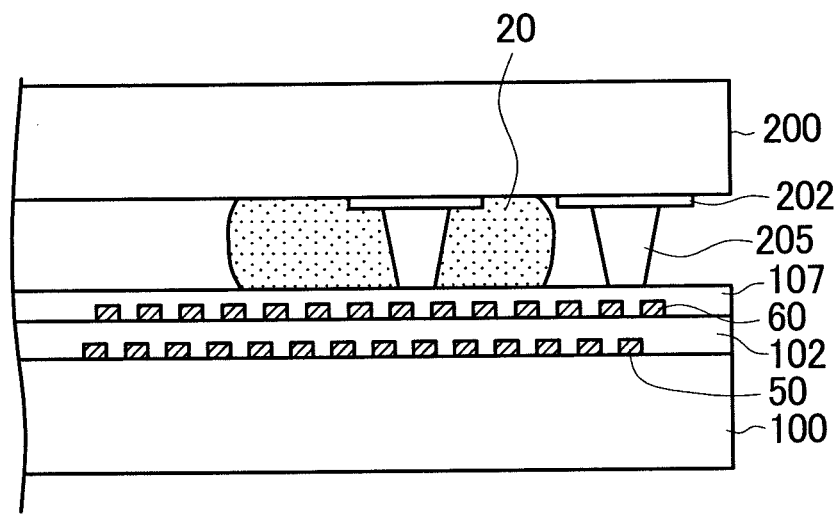
FIG. 24 shows a first shape of a seal portion in Embodiment 3.

FIG. 24 is a schematic cross-sectional view of the seal portion in Embodiment 3. In FIG. 24, the column spacer 205 is formed in the seal portion, so that the column spacer 205 defines the gap between the TFT substrate 100 and the counter substrate 200 in the seal portion. Accordingly, the same gap as that in the display region 10 can be maintained.

In FIG. 24, glass fibers are not dispersed in the sealing material 20. Therefore, even when the two-layer wiring of the first scanning line lead wires 50 and the second scanning line lead wires 60 is formed in the seal portion, the inorganic passivation film 107, the gate insulating film 102, the scanning line lead wires, or the like is not broken. That is, when the scanning line lead wires have the two-layer structure, the irregularities on the surface of the inorganic passivation film becomes large. However, when the gap in the seal portion is set not with hard glass fibers but with column spacers formed of a resin like the invention, the breakage of the scanning line lead wires or the like can be prevented.

The sealing material 20 is in contact with the inorganic passivation film 107 formed of SiN on the TFT substrate 100 side. Therefore, the adhesive force is high, and the reliability of the seal portion is high. The alignment film does not exist in the seal portion both on the TFT substrate 100 side and on the counter electrode 204 side. Further, FIG. 24 has a feature in that the column spacer 205 is also formed outside the sealing material 20. With this configuration, the gap between the TFT substrate 100 and the counter substrate 200 can be precisely set in the seal portion.

Figure 25:
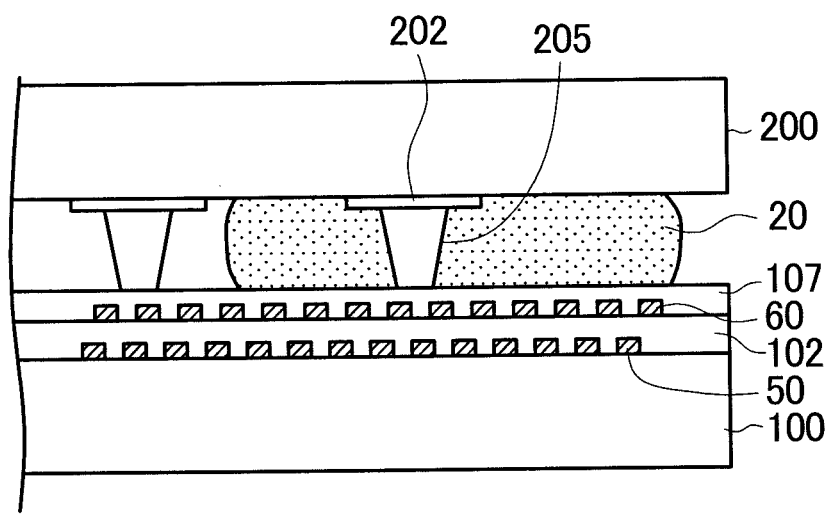
FIG. 25 shows a second shape of the seal portion in Embodiment 3.

FIG. 25 is similar to FIG. 24 in that the column spacers 205 are formed in the sealing material 20. However, the column spacers 205 are also formed inside the sealing material 20. Also with the configuration of FIG. 25, the gap between the TFT substrate 100 and the counter substrate 200 can be precisely set in the seal portion.

Figure 26:
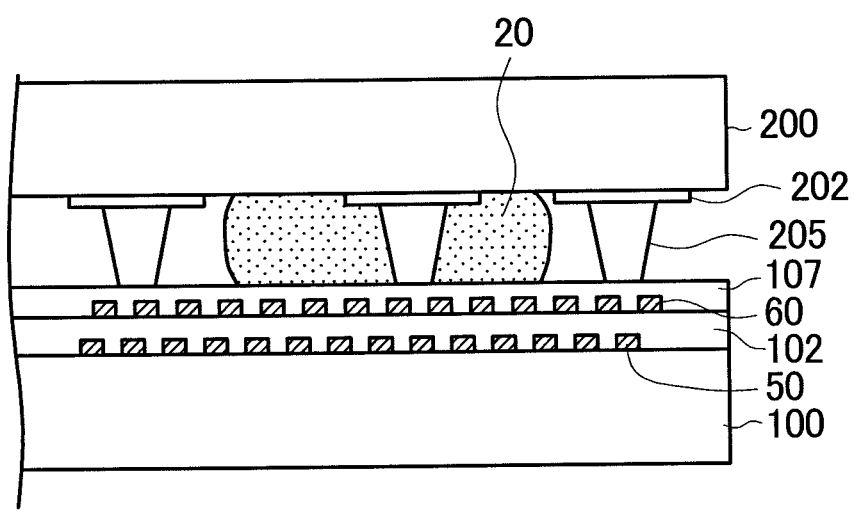
FIG. 26 shows a third shape of the seal portion in Embodiment 3.

FIG. 26 is similar to FIG. 24 in that the column spacer 205 is formed in the sealing material 20. However, the column spacers 205 are formed on both sides of the sealing material 20. Since the column spacers 205 are formed on both sides of the sealing material 20 in the configuration of FIG. 26, the gap between the TFT substrate 100 and the counter substrate 200 can be set more precisely in the seal portion. Although FIGS. 24 to 26 show the typical TN type liquid crystal display device, the configuration of Embodiment 3 can be applied to the IPS type liquid crystal display device in the same manner.

In the above description, the invention is applied to the configuration of the typical TN type in Embodiment 1 and to the configuration of the IPS type in Embodiment 2. However, the invention is not limited to these liquid crystal display devices but can be applied to a so-called VA (Vertical Alignment) type liquid crystal display device or the like.

What is claimed is:

1. A display device comprising:
    a display panel having a display region and a peripheral region, the display panel including a TFT substrate, a counter substrate fixed to the TFT substrate by seal material formed at the peripheral region, and liquid crystal interposed between the TFT substrate and the counter substrate;
    wherein the TFT substrate includes an inorganic film and an organic film disposed between the inorganic film and the liquid crystal, with first column spacers being formed on the counter substrate;
    wherein the organic film includes a first part which has an island-like shape formed at the peripheral region and a second part formed at the display region;
    wherein the seal material is an adhesive to fix the TFT substrate and the counter substrate, and the seal material covers at least one of the first column spacers and the first part of the organic film; and
    wherein the first part of the organic film is separated from the second part of the organic film, and the seal material is in contact with the inorganic film at an area between the first part of the organic film and the second part of the organic film.

2. A display device according to claim 1, wherein the inorganic film is formed between the organic film and the TFT substrate.

3. A display device according to claim 1, wherein second column spacers are formed on the counter substrate outside of the seal material at the peripheral region, and the organic film includes a third part which has an island-like shape facing the second column spacers.

4. A display device according to claim 1, wherein the TFT substrate includes a first electrode and a second electrode formed between the organic film and the liquid crystal.

5. A display device according to claim 1, wherein in the seal portion, semiconductor films are formed like islands on the TFT substrate.

6. A liquid crystal display device according to claim 1, wherein in the seal portion, color filters are formed like islands on the counter substrate.

7. A display device according to claim 2, wherein second column spacers are formed on the counter substrate outside of the seal material at the peripheral region, and the organic film includes a third part which has an island-like shape facing the second column spacers.

8. A display device according to claim 2, wherein the TFT substrate includes a first electrode and a second electrode formed between the organic film and the liquid crystal.

9. A display device according to claim 2, wherein in the seal portion, semiconductor films are formed like islands on the TFT substrate.

10. A liquid crystal display device according to claim 2, wherein in the seal portion, a color filters are formed like islands on the counter substrate.

11. A display device according to claim 4, wherein second column spacers are formed on the counter substrate outside of the seal material at the peripheral region, and the organic film includes a third part which has an island-like shape facing the second column spacers.

12. A display device according to claim 4, wherein in the seal portion, semiconductor films are formed like islands on the TFT substrate.

13. A liquid crystal display device according to claim 4, wherein in the seal portion, color filters are formed like islands on the counter substrate.

14. A liquid crystal display device according to claim 5, wherein in the seal portion, the color filters are formed like islands on a counter substrate side.

* * * * *